(12) United States Patent
Kim et al.

(10) Patent No.: US 12,425,655 B2
(45) Date of Patent: Sep. 23, 2025

(54) METHOD AND APPARATUS FOR IMAGE DECODING AND IMAGE ENCODING USING AI PREDICTION BLOCK

(71) Applicant: SAMSUNG ELECTRONICS CO., LTD., Suwon-si (KR)

(72) Inventors: Kyungah Kim, Suwon-si (KR); Quockhanh Dinh, Suwon-si (KR); Minsoo Park, Suwon-si (KR); Minwoo Park, Suwon-si (KR); Kwangpyo Choi, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 18/237,109

(22) Filed: Aug. 23, 2023

(65) Prior Publication Data
US 2024/0064336 A1  Feb. 22, 2024

Related U.S. Application Data

(63) Continuation of application No. PCT/KR2023/012059, filed on Aug. 14, 2023.

(30) Foreign Application Priority Data

Aug. 18, 2022  (KR) .................. 10-2022-0103412
Sep. 6, 2022  (KR) .................. 10-2022-0112984

(51) Int. Cl.
*H04N 19/66* (2014.01)
*H04N 19/105* (2014.01)
(Continued)

(52) U.S. Cl.
CPC .......... *H04N 19/66* (2014.11); *H04N 19/105* (2014.11); *H04N 19/132* (2014.11); *H04N 19/176* (2014.11)

(58) Field of Classification Search
None
See application file for complete search history.

(56) References Cited

U.S. PATENT DOCUMENTS 9,924,191 B2   3/2018  Chen et al.
11,115,673 B2*  9/2021  Yang .................. H04N 19/103
(Continued)

FOREIGN PATENT DOCUMENTS

KR  10-2019-0043930 A   4/2019
KR  10-2020-0004418 A   1/2020
(Continued)

OTHER PUBLICATIONS

International Search Report issued Nov. 15, 2023 by the International Searching Authority in International Patent Application No. PCT/KR2023/012059. (PCT/ISA/220, PCT/ISA/210 and PCT/ISA/237).

*Primary Examiner* — Chikaodili E Anyikire
(74) *Attorney, Agent, or Firm* — Sughrue Mion, PLLC

(57) ABSTRACT

A method of decoding an image, including obtaining a motion vector of a current block; obtaining a preliminary prediction block based on a reference block indicated by the motion vector in a reference image; obtaining a final prediction block for the current block by applying, to a neural network, at least one of a picture order count (POC) map including a POC difference between the reference image and a current image including the current block, the preliminary prediction block, and a quantization error map; and reconstructing the current block based on the final prediction block and a residual block obtained from a bitstream, wherein sample values of the quantization error map are calculated based on a quantization parameter for the reference block.

13 Claims, 24 Drawing Sheets

(51) Int. Cl.
*H04N 19/132* (2014.01)
*H04N 19/176* (2014.01)

(56) References Cited

U.S. PATENT DOCUMENTS

| | | |
|---|---|---|
| 11,128,873 B2 | 9/2021 | Katayama |
| 11,153,601 B2 | 10/2021 | Alshin et al. |
| 11,190,760 B1* | 11/2021 | Zhao .................... H04N 19/132 |
| 11,303,920 B2 | 4/2022 | Lee et al. |
| 2020/0336747 A1 | 10/2020 | Seo |
| 2021/0136402 A1 | 5/2021 | Lim et al. |
| 2021/0168403 A1 | 6/2021 | Abe et al. |
| 2022/0007045 A1 | 1/2022 | Yang |
| 2022/0078441 A1 | 3/2022 | Chen et al. |
| 2022/0101492 A1* | 3/2022 | Ding ...................... H04N 19/86 |
| 2022/0116627 A1 | 4/2022 | Liu et al. |
| 2022/0167000 A1 | 5/2022 | Kwon et al. |
| 2022/0215593 A1* | 7/2022 | Wang .................. H04N 19/157 |
| 2022/0261616 A1* | 8/2022 | Li ........................... G06N 3/04 |
| 2022/0353528 A1* | 11/2022 | Ding .................... H04N 19/593 |
| 2023/0007240 A1* | 1/2023 | Li ......................... H04N 19/577 |
| 2023/0283768 A1 | 9/2023 | Sim et al. |
| 2023/0291926 A1 | 9/2023 | Kang et al. |
| 2023/0403407 A1* | 12/2023 | Deng ...................... H04N 19/14 |
| 2024/0015284 A1* | 1/2024 | Wang .................. H04N 19/117 |

FOREIGN PATENT DOCUMENTS

| | | |
|---|---|---|
| KR | 10-2020-0058546 A | 5/2020 |
| KR | 10-2022-0003037 A | 1/2022 |
| KR | 10-2022-0017372 A | 2/2022 |
| KR | 10-2022-0018447 A | 2/2022 |
| WO | 2022/128137 A1 | 6/2022 |

* cited by examiner

FIG. 16

| INDEX | WEIGHT SET |
|---|---|
| 0 | A WEIGHT SET |
| 1 | B WEIGHT SET |
| 2 | C WEIGHT SET |

METHOD AND APPARATUS FOR IMAGE DECODING AND IMAGE ENCODING USING AI PREDICTION BLOCK

CROSS-REFERENCE TO RELATED APPLICATIONS

This application is a continuation of International Application No. PCT/KR2023/012059, filed on Aug. 14, 2023, in the Korean Intellectual Property Receiving Office, which is based on and claims priority to Korean Patent Application No. 10-2022-0103412, filed on Aug. 18, 2022, and Korean Patent Application No. 10-2022-0112984, filed on Sep. 6, 2022, in the Korean Intellectual Property Office, the disclosures of which are incorporated by reference herein in their entireties.

BACKGROUND

1. Field

The disclosure relates to a method and apparatus for processing an image, and more particularly, to a method and apparatus for encoding/decoding an image using artificial intelligence (AI).

2. Description of Related Art

In a codec such as H.264 advanced video coding (AVC) or high efficiency video coding (HEVC), an image may be divided into blocks and the blocks may be encoded and decoded through inter prediction or intra prediction.

Intra prediction may refer to a method of compressing an image by removing spatial redundancy in an image, and inter prediction may be a method of compressing an image by removing temporal redundancy between images.

In an encoding process, a prediction block of a current block may be generated through intra prediction or inter prediction, a residual block may be generated by subtracting the prediction block from the current block, and residual samples of the residual block may be transformed and quantized.

In a decoding process, residual samples of a residual block may be generated by inverse-quantizing and inverse-transforming quantized transform coefficients of the residual block, and a current block may be reconstructed by adding a prediction block generated through intra prediction or inter prediction to the residual block. The reconstructed current block may be processed according to one or more filtering algorithms and then may be output.

In a codec such as H.264 AVC or HEVC, a rule-based prediction mode may be used for inter prediction of a current block. The rule-based prediction mode may include, for example, a skip mode, a merge mode, or an advanced motion vector prediction (AMVP) mode.

However, as a resolution of an image increases and content of an image diversifies, there is a need for a prediction mode that may flexibly consider characteristics of an image.

SUMMARY

Provided is a method of decoding an image which may include obtaining a motion vector of a current block, according to an embodiment of the disclosure.

Additional aspects will be set forth in part in the description which follows and, in part, will be apparent from the description, or may be learned by practice of the presented embodiments.

In accordance with an aspect of the disclosure, a method of decoding an image includes obtaining a motion vector of a current block, obtaining a preliminary prediction block based on a reference block indicated by the motion vector in a reference image; obtaining a final prediction block for the current block by applying, to a neural network, at least one of a picture order count (POC) map including a POC difference between the reference image and a current image including the current block, the preliminary prediction block, or a quantization error map; and reconstructing the current block based on the final prediction block and a residual block obtained from a bitstream, wherein sample values of the quantization error map are calculated based on a quantization parameter for the reference block.

The sample values of the quantization error map may correspond to a quantization step size or a quantization error value calculated based on the quantization parameter for the reference block.

The quantization error map may be divided into sub-areas corresponding to lower blocks of the reference block, and sample values respectively included in the sub-areas of the quantization error map may be calculated based on a quantization parameter for a sample at a position in the lower blocks of the reference block.

The obtaining of the final prediction block of the current block may include applying, to the neural network, at least one of an enlarged POC map, an enlarged preliminary prediction block, or an enlarged quantization error map, and the at least one of the enlarged POC map, the enlarged preliminary prediction block, or the enlarged quantization error map may be obtained by padding the at least one of the POC map, the preliminary prediction block, or the quantization error map according to an enlarged distance.

The neural network may include one or more convolution layers, and the method may further include: determining the enlarged distance based on a number of the one or more convolution layers included in the neural network, a size of a filter kernel used in the one or more convolution layers, and a stride, and obtaining the enlarged preliminary prediction block including neighboring samples corresponding to the enlarged distance from among neighboring samples outside a boundary of the reference block in the reference image and samples of the preliminary prediction block.

The method may further include obtaining the enlarged quantization error map including sample values calculated from a quantization parameter for neighboring samples corresponding to the enlarged distance in the reference image and the quantization parameter for the reference block.

Based on a boundary of the reference block corresponding to a boundary of the reference image, neighboring samples corresponding to the enlarged distance may be determined from a closest sample available in the reference image.

The obtaining of the final prediction block for the current block may include applying, to the neural network, an enlarged current reconstructed block together with the at least one of the enlarged POC map, the enlarged preliminary prediction block, or the enlarged quantization error map, and the enlarged current reconstructed block may include neighboring samples which were reconstructed before the current block in the current image and samples other than samples corresponding to the neighboring samples from among samples of the enlarged preliminary prediction block.

The method may further include selecting a weight set used to obtain the final prediction block from among a plurality of weight sets, based on at least one of a size of the current block, a prediction direction of the current block, the quantization parameter for the reference block, a layer to which the current image belongs in a hierarchical structure of an image, or information obtained from the bitstream, and the final prediction block may be obtained based on the neural network operating according to the selected weight set.

In accordance with an aspect of the disclosure, a non-transitory computer-readable recording medium has recorded thereon instructions which, when executed by at least one processor, cause the at least one processor to: obtain a motion vector of a current block; obtain a preliminary prediction block based on a reference block indicated by the motion vector in a reference image; obtain a final prediction block for the current block by applying, to a neural network, at least one of a POC map including a POC difference between the reference image and a current image including the current block, the preliminary prediction block, or a quantization error map; and reconstruct the current block based on the final prediction block and a residual block obtained from a bitstream, wherein sample values of the quantization error map are calculated based on a quantization parameter for the reference block.

In accordance with an aspect of the disclosure, a method of encoding an image includes obtaining a motion vector indicating a reference block in a reference image corresponding to a current block; obtaining a final prediction block for the current block by applying, to a neural network, at least one of a POC map including a POC difference between the reference image and a current image including the current block, a preliminary prediction block obtained based on the reference block, or a quantization error map; obtaining a residual block based on the current block and the final prediction block; and generating a bitstream including information about the residual block, wherein sample values of the quantization error map are calculated based on a quantization parameter for the reference block.

The method may further include changing precision of the obtained motion vector from fractional precision to integer precision, and the reference block indicated by the motion vector having the integer precision may be determined as the preliminary prediction block.

The obtaining of the final prediction block for the current block may include applying, to the neural network, at least one of an enlarged POC map, an enlarged preliminary prediction block, or an enlarged quantization error map, and the at least one of the enlarged POC map, the enlarged preliminary prediction block, or the enlarged quantization error map may be obtained by padding the at least one of the POC map, the preliminary prediction block, or the quantization error map according to an enlarged distance.

In accordance with an aspect of the disclosure, an image decoding apparatus includes at least one memory configured to store at least one instruction; and at least one processor configured to execute the at least one instruction to: obtain a motion vector of a current block, obtain a preliminary prediction block based on a reference block indicated by the motion vector in a reference image, obtain a final prediction block for the current block by applying, to a neural network, at least one of a POC map including a POC difference between the reference image and a current image including the current block, the preliminary prediction block, or a quantization error map, and reconstruct the current block based on the final prediction block and a residual block obtained from a bitstream, wherein sample values of the quantization error map are calculated based on a quantization parameter for the reference block.

In accordance with an aspect of the disclosure, an image encoding apparatus includes at least one memory configured to store at least one instruction; and at least one processor configured to execute the at least one instruction to: obtain a motion vector indicating a reference block in a reference image corresponding to a current block, obtain a final prediction block for the current block by applying, to a neural network, at least one of a POC map including a POC difference between the reference image and a current image including the current block, a preliminary prediction block obtained based on the reference block, and a quantization error map, obtain a residual block based on the current block and the final prediction block, and generate a bitstream including information about the residual block, wherein sample values of the quantization error map are calculated based on a quantization parameter for the reference block.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 16 is a diagram illustrating a plurality of weight sets, according to an embodiment of the disclosure;

DETAILED DESCRIPTION

Figure 1:
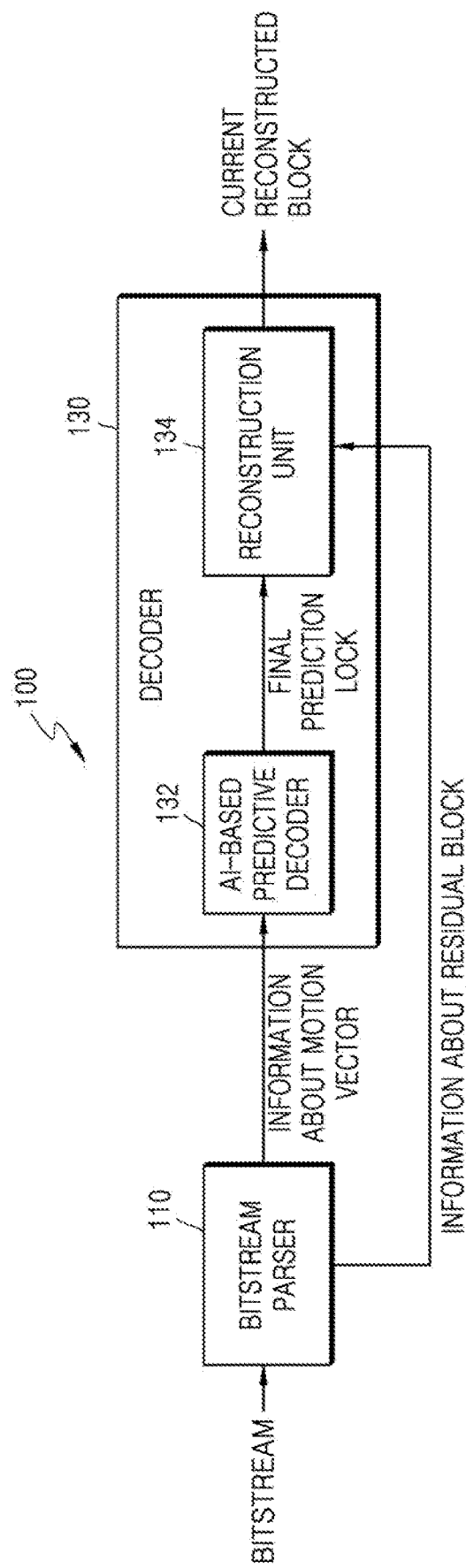
FIG. 1 is a diagram illustrating a configuration of an image decoding apparatus, according to an embodiment of the disclosure.

A method of decoding an image according to an embodiment of the disclosure may include obtaining a motion vector of a current block.

In an embodiment of the disclosure, the method may include obtaining a preliminary prediction block using a reference block indicated by the motion vector in a reference image.

In an embodiment of the disclosure, the method may include obtaining a final prediction block of the current block by applying, to a neural network, at least one of a picture order count (POC) map including a POC difference between the reference image and a current image including the current block, the preliminary prediction block, or a quantization error map.

In an embodiment of the disclosure, the method may include reconstructing the current block using the final prediction block and a residual block obtained from a bitstream.

In an embodiment of the disclosure, sample values of the quantization error map may be calculated from a quantization parameter for the reference block.

As the disclosure allows for various changes and numerous examples, particular embodiments of the disclosure will be illustrated in the drawings and described in detail in the written description. However, this is not intended to limit the disclosure to particular modes of practice, and all changes, equivalents, and substitutes that do not depart from the spirit and technical scope of various embodiments of the disclosure may be encompassed in the disclosure.

In the description of embodiments of the disclosure, certain detailed explanations of related art may be omitted when it is deemed that they may unnecessarily obscure the description. Also, numbers (e.g., a first, a second, and the like) used in the description are merely identifiers for distinguishing one element from another, and are not intended to denote order or preference unless otherwise indicated.

Throughout the disclosure, the expression "at least one of a, b or c" indicates only a, only b, only c, both a and b, both a and c, both b and c, all of a, b, and c, or variations thereof.

In the disclosure, when elements are described as being "connected" or "coupled" to each other, the elements may be directly connected or coupled to each other, or may be connected or coupled to each other with an intervening element therebetween, unless specified otherwise.

In the disclosure, regarding an element represented as a " . . . unit" or a "module", two or more elements may be combined into one element or one element may be divided into two or more elements according to subdivided functions. Each element described hereinafter may additionally perform some or all of functions performed by another element, in addition to main functions of itself, and some of the main functions of each element may be performed entirely by another component.

In the disclosure, an "image" or a "picture" may refer to a still image, a moving image including a plurality of consecutive still images (or frames), or a video.

Also, in the disclosure, a "neural network" may refer to a representative example of an artificial neural network model simulating brain nerves, and is not limited to an artificial neural network model using a specific algorithm. The neural network may be referred to as a deep neural network.

In the disclosure, a "weight" may refer a value used in an operation process of each of layers constituting a neural network. For example, a weight may be used when an input value is applied to a certain operation expression. The weight is a value set as a result of training, and may be updated using separate training data.

In the disclosure, a "current block", may refer to a block currently being processed. The current block may be a slice, a tile, a largest coding unit, a coding unit, a prediction unit, or a transform unit divided from a current image.

In the disclosure, a "sample" may refer to data assigned to a sampling position in data such as an image, a block, a filter kernel, or a map, which is to be processed. For example, the sample may include a pixel in a two-dimensional (2D) image.

Before describing an image decoding apparatus 100 and an image encoding apparatus 1900 according to an embodiment of the disclosure, an example of a general image encoding and decoding process is described with reference to FIG. 24.

Figure 24:
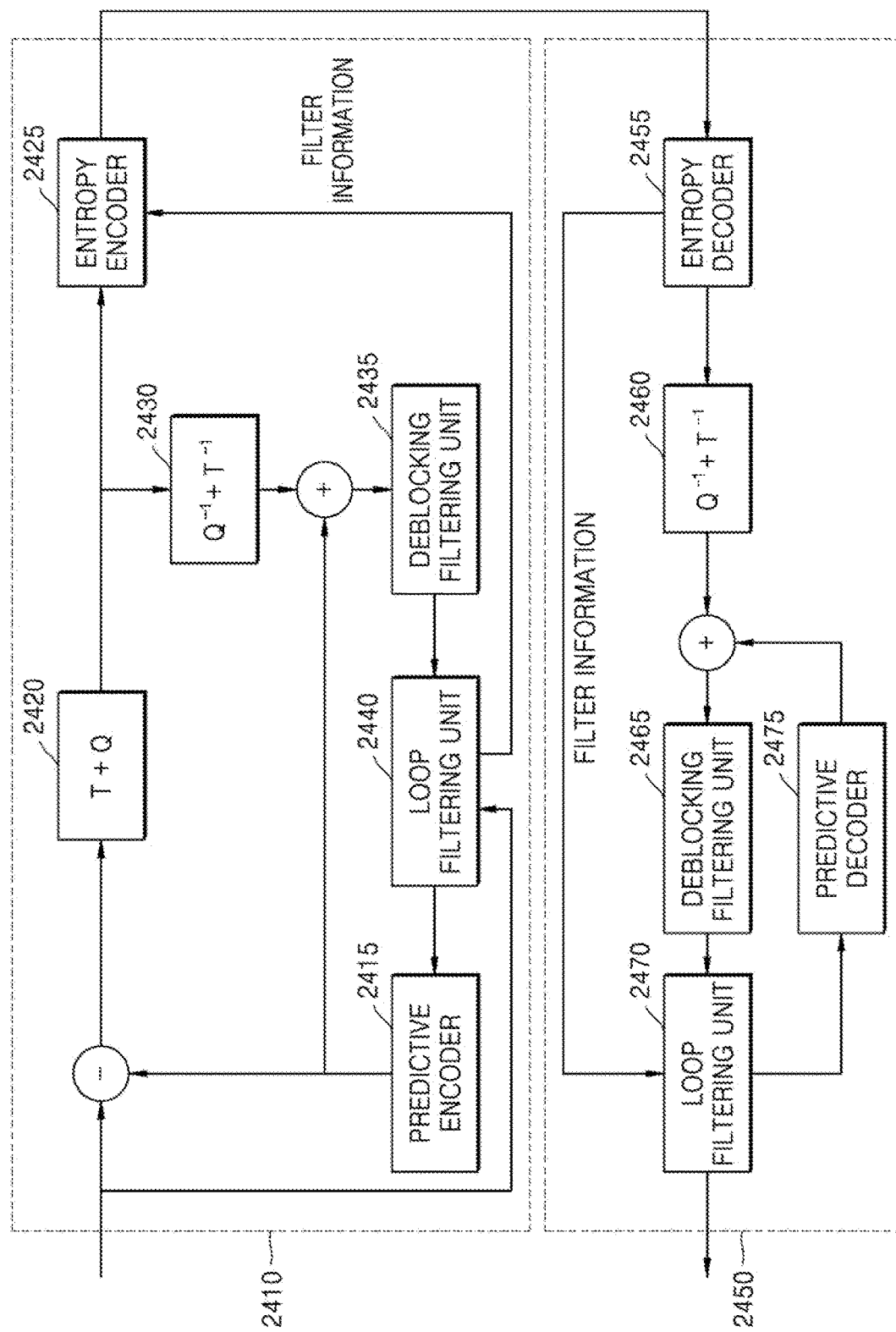
FIG. 24 is a diagram for describing a general encoding and decoding process of an image, according to an embodiment of the disclosure.

FIG. 24 is a diagram illustrating a general image encoding and decoding process, according to an embodiment of the disclosure.

An encoding apparatus 2410 may transmit a bitstream generated through encoding on an image to a decoding apparatus 2450, and the decoding apparatus 2450 may reconstruct the image by receiving and decoding the bitstream.

In an embodiment of the disclosure, a predictive encoder 2415 of the encoding apparatus 2410 may output a prediction block through inter prediction or intra prediction on a current block, and a transform and quantization unit 2420 (illustrated as "T+Q") may output a quantized transform coefficient by transforming and quantizing residual samples of a residual block between the prediction block and the current block.

An entropy encoder 2425 may encode the quantized transform coefficient and may output a bitstream.

The quantized transform coefficient may be reconstructed into the residual block including the residual samples in a spatial domain through an inverse-quantization and inverse-transform unit 2430 (illustrated as "$Q^{-1}+T^{-1}$"). A reconstructed block obtained by adding the prediction block to the residual block may be output as a filtered block using a deblocking filtering unit 2435 and a loop filtering unit 2440. A reconstructed image including the filtered block may be used as a reference image for a next image in the predictive encoder 2415.

The bitstream received by the decoding apparatus 2450 may be reconstructed into the residual block including the residual blocks of the spatial domain through an entropy decoder 2455 and an inverse-quantization and inverse-transform unit 2460.

A reconstructed block may be generated by combining the residual block and a prediction block output from a predictive decoder 2475, and the reconstructed block may be output as a filtered block through a deblocking filtering unit 2465 and a loop filtering unit 2470. A reconstructed image including the filtered block may be used as a reference image for a next image in the predictive decoder 2475.

In an embodiment of the disclosure, the predictive encoder 2415 and the predictive decoder 2475 may perform predictive encoding and predictive decoding on the current block according to a rule-based prediction mode and/or a neural network-based prediction mode.

In an embodiment of the disclosure, the rule-based prediction mode may include a merge mode, a skip mode, an advanced motion vector prediction (AMVP) mode, a bi-directional optical flow (BDOF) mode, or a bi-prediction with coding unit (CU)-level weights (BCW).

In an embodiment of the disclosure, the predictive encoder 2415 and the predictive decoder 2475 may apply the rule-based prediction mode and the neural network-based prediction mode to the current block.

An example of a neural network-based prediction mode according to an embodiment of the disclosure is described in detail with reference to FIGS. 1 to 23.

Referring to FIG. 1, the image decoding apparatus 100 may include a bitstream parser 110 and a decoder 130. The decoder 130 may include an artificial intelligence (AI)-based predictive decoder 132 and a reconstruction unit 134.

In an embodiment of the disclosure, the bitstream parser 110 may correspond to the entropy decoder 2455 of FIG. 24. In an embodiment of the disclosure, the decoder 130 may correspond to the inverse-quantization and inverse-transform unit 2460, the predictive decoder 2475, the deblocking filtering unit 2465, and the loop filtering unit 2470.

The bitstream parser 110 and the decoder 130 may be implemented as, by, or using at least one processor. The bitstream parser 110 and the decoder 130 may operate according to at least one instruction stored in at least one memory.

Although the bitstream parser 110 and the decoder 130 are individually illustrated in FIG. 1, embodiments are not limited thereto. For example, in some embodiments the bitstream parser 110 and the decoder 130 may be implemented through one processor. In this case, the bitstream parser 110 and the decoder 130 may be implemented as, by, or using a dedicated processor, or may be implemented through a combination of software and a general-purpose processor such as an application processor (AP), a central processing unit (CPU), or a graphics processing unit (GPU). Also, when the bitstream parser 110 and the decoder 130 are implemented as, by, or using a dedicated processor, the dedicated processor may include at least one of a memory for implementing an embodiment of the disclosure or a memory processor for using an external memory.

In an embodiment of the disclosure, the bitstream parser 110 and the decoder 130 may include a plurality of processors. In this case, the bitstream parser 110 and the decoder 130 may be implemented through a combination of dedicated processors, or a combination of software and a plurality of general-purpose processors such as an AP, a CPU, and a GPU.

The bitstream parser 110 may obtain a bitstream including a result of encoding an image.

The bitstream parser 110 may receive a bitstream through a network from the image encoding apparatus 1900.

In an embodiment of the disclosure, the bitstream parser 110 may obtain a bitstream from any of data storage media including a magnetic medium such as a hard disk, a floppy disk, or a magnetic tape, an optical recording medium such as a compact disk read-only memory (CD-ROM) or a digital versatile disk (DVD), and a magneto-optical medium such as a floptical disk.

The bitstream parser 110 may obtain pieces of information required to reconstruct the image by parsing the bitstream.

In an embodiment of the disclosure, the bitstream parser 110 may obtain syntax elements for reconstructing the image from the bitstream. Binary values corresponding to the syntax elements may be included in the bitstream according to a hierarchical structure of the image. The bitstream parser 110 may obtain the syntax elements by entropy-coding the binary values included in the bitstream.

In an embodiment of the disclosure, the bitstream parser 110 may transmit information about a motion vector and information about a residual block obtained from the bitstream to the decoder 130.

The decoder 130 may obtain a current reconstructed block based on the information transmitted from the bitstream parser 110. The current reconstructed block may refer to a block obtained through decoding on a current block.

In an embodiment of the disclosure, the AI-based predictive decoder 132 may obtain a final prediction block of the current block using the information about the motion vector.

The AI-based predictive decoder 132 may obtain the final prediction block of the current block using AI, for example, a neural network.

A mode in which the AI-based predictive decoder 132 obtains the final prediction block of the current block using the neural network may be defined as a neural network-based prediction mode.

The reconstruction unit 134 may obtain a residual block of the current block using the information about the residual block provided from the bitstream parser 110. In an embodiment of the disclosure, the information about the residual block may include information about a quantized transform coefficient.

In an embodiment of the disclosure, the reconstruction unit 134 may obtain a residual block in a spatial domain by inverse-quantizing and inverse-transforming the quantized transform coefficient.

The reconstruction unit 134 may obtain a current reconstructed block corresponding to the current block using the final prediction block and the residual block. In an embodiment of the disclosure, the reconstruction unit 134 may obtain the current reconstructed block by adding sample values of the final prediction block to sample values of the residual block.

An example of an AI-based predictive decoder 132 is described in more detail with reference to FIG. 2.

Figure 2:
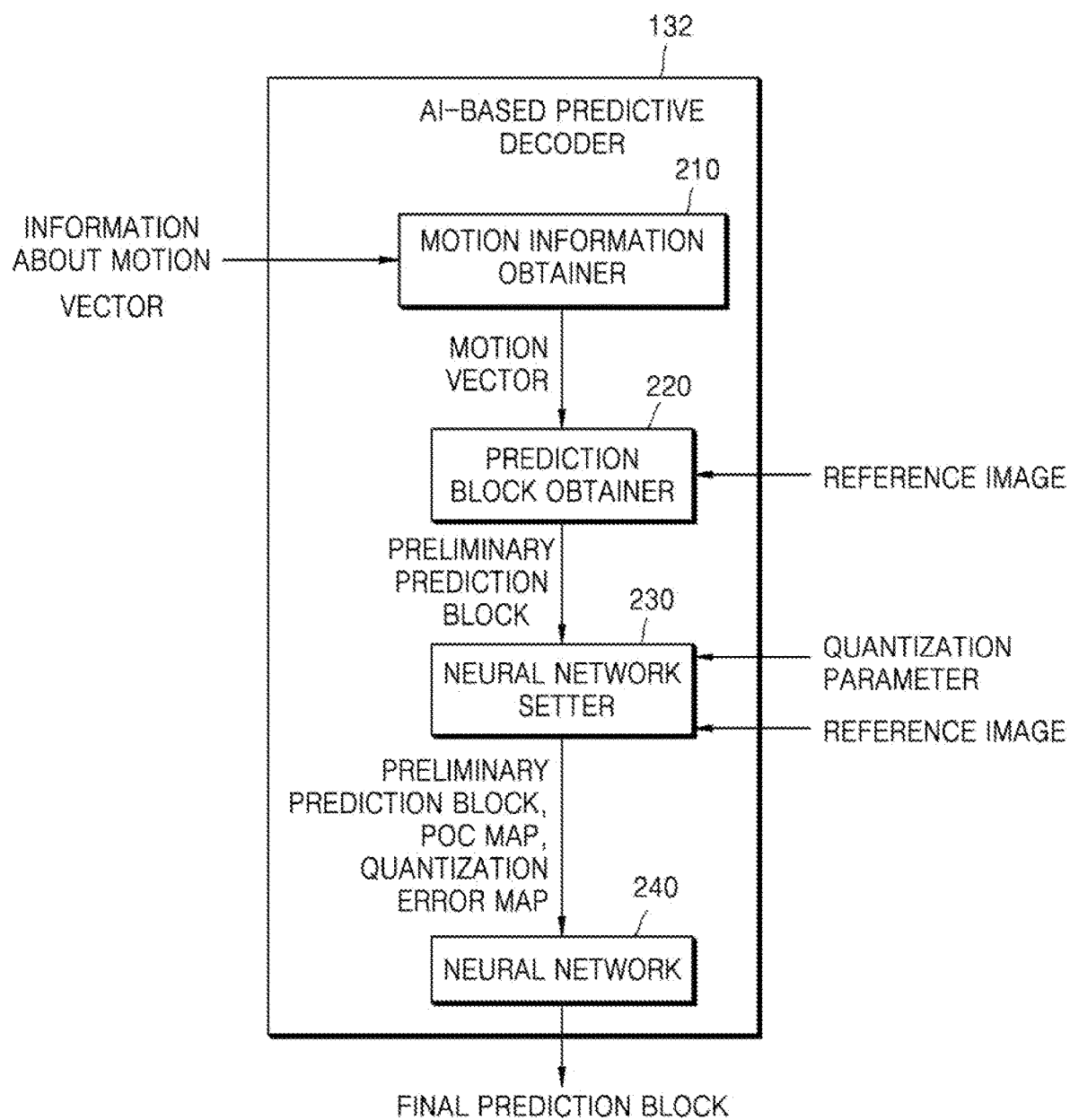
FIG. 2 is a diagram illustrating a configuration of an artificial intelligence (AI)-based predictive decoder, according to an embodiment of the disclosure.

FIG. 2 is a diagram illustrating a configuration of the AI-based predictive decoder 132, according to an embodiment of the disclosure.

Referring to FIG. 2, the AI-based predictive decoder 132 may include a motion information obtainer 210, a prediction block obtainer 220, a neural network setter 230, and a neural network 240.

The neural network 240 may be stored in a memory. In an embodiment of the disclosure, the neural network 240 may be implemented as, by, or using an AI processor.

The motion information obtainer 210 may obtain a motion vector of a current block using information about a motion vector. As described below, when a precision of the motion vector of the current block is changed from fractional precision to integer precision by a motion information obtainer 2010 of the image encoding apparatus 1900, the motion information obtainer 210 may obtain the motion vector having the integer precision of the current block.

The information about the motion vector may include information indicating at least one motion vector candidate from among motion vector candidates included in a motion vector candidate list, for example, a flag or an index. In an embodiment of the disclosure, the information about the motion vector may further include information about a residual motion vector corresponding to a difference between a prediction motion vector of the current block and the motion vector of the current block.

The prediction block obtainer 220 may obtain a preliminary prediction block using a reference image and the motion vector of the current block obtained by the motion information obtainer 210.

In an embodiment of the disclosure, the motion information obtainer 210 and the prediction block obtainer 220 may obtain the preliminary prediction block of the current block based on a rule-based prediction mode.

The rule-based prediction mode may include a merge mode, a skip mode, or an AMVP mode.

According to the merge mode or the skip mode, the motion information obtainer 210 may construct a motion vector candidate list including motion vectors of neighboring blocks of the current block as motion vector candidates, and may determine a motion vector candidate indicated by information included in a bitstream from among the motion vector candidates included in the motion vector candidate list as the motion vector of the current block.

Also, according to the AMVP mode, the motion information obtainer 210 may construct a motion vector candidate list including motion vectors of neighboring blocks of the current block as motion vector candidates, and may determine a motion vector candidate indicated by information included in a bitstream from among the motion vector candidates included in the motion vector candidate list as the prediction motion vector of the current block. The motion information obtainer 210 may determine the motion vector of the current block using the prediction motion vector of the current block and the residual motion vector.

The merge mode, the skip mode, or the AMVP mode is an example of the rule-based prediction mode, and in an embodiment of the disclosure, the rule-based prediction mode may further include a decoder-side motion vector refinement (DMVR) mode.

In the merge mode, the skip mode, and the AMVP mode, a process of constructing a motion vector candidate list may be commonly performed. Examples of neighboring blocks that may be included in the motion vector candidate list are described with reference to FIG. 3.

Figure 3:
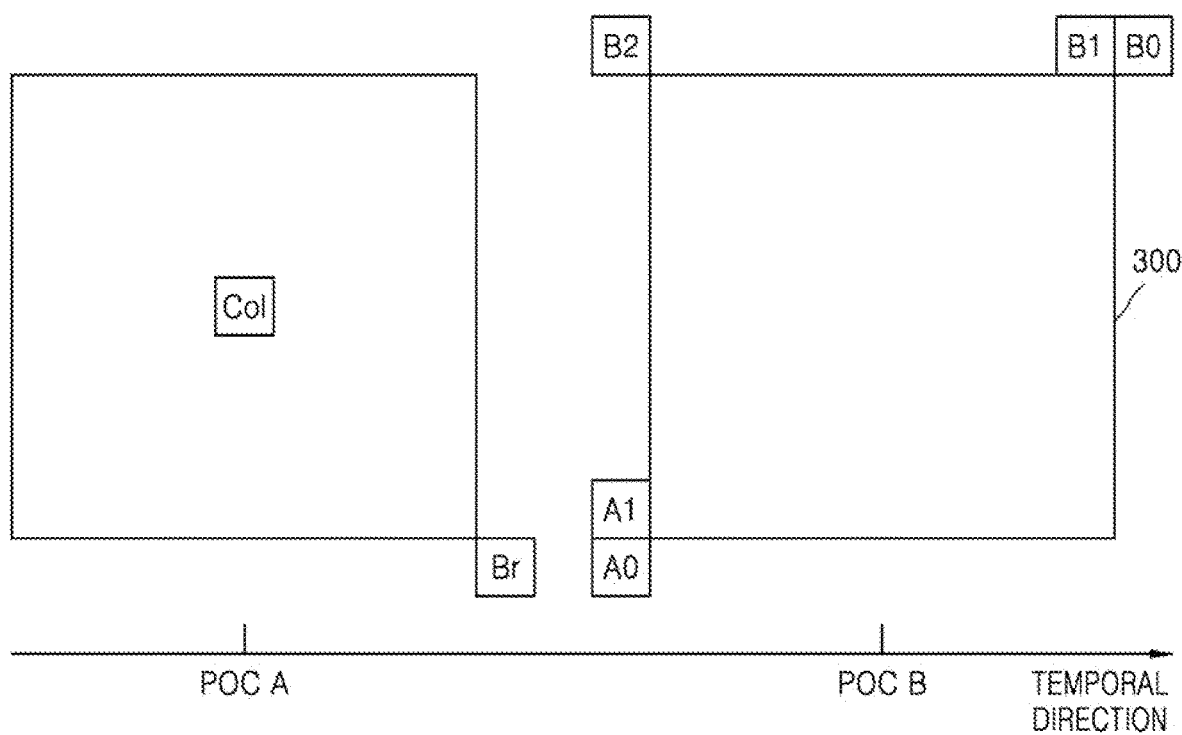
FIG. 3 is a diagram illustrating a spatial neighboring block and a temporal neighboring block of a current block, according to an embodiment of the disclosure.

Referring to FIG. 3, neighboring blocks of a current block 300 may include spatial neighboring blocks (e.g., block A0, block A1, block B0, block B1, and block B2) which are spatially adjacent to the current block 300 and temporal blocks (e.g., block Col and block Br) which are temporally adjacent to the current block 300.

In an embodiment of the disclosure, the spatial neighboring blocks may include at least one of a lower left corner block A0, a lower left block A1, an upper right corner block B0, an upper right block B1, or an upper left corner block B2.

In an embodiment of the disclosure, the temporal neighboring blocks may include at least one of a block Col located at the same point as the current block in a collocated image having a picture order count (POC) different from a POC of a current image including the current block 300 or a block Br spatially adjacent to the block Col located at the same point.

The block Br may be located at the lower right of the block Col located at the same point as the current block 300. The block Col located at the same point as the current block 300 may be a block including a pixel corresponding to a central pixel in the current block 300, from among pixels included in the collocated image.

The motion information obtainer 210 may determine availability of neighboring blocks according to a certain order, and may sequentially include motion vectors of the neighboring blocks as motion vector candidates in a motion vector candidate list according to a determination result.

In an embodiment of the disclosure, when a neighboring block is intra-predicted, the motion information obtainer 210 may determine that there is no availability of the block.

In an embodiment of the disclosure, a motion vector obtained by the motion information obtainer 210 may include a motion vector for list 0, a motion vector for list 1, or a motion vector for list 0 and a motion vector for list 1.

The motion vector for list 0 may be a motion vector for indicating a reference block in a reference image included in list 0 (or for example reference image list 0), and the motion vector for list 1 may be a motion vector for indicating a reference block in a reference image included in list 1 (or for example reference image list 1).

The prediction block obtainer 220 may obtain a preliminary prediction block using a reference block indicated by a motion vector in a reference image.

In an embodiment of the disclosure, the preliminary prediction block may be obtained by applying interpolation to the reference block indicated by the motion vector in the reference image. Accordingly, the preliminary prediction block may include sub-pixels obtained by applying filtering to integer pixels.

In an embodiment of the disclosure, the reference block indicated by the motion vector in the reference image may be determined as a preliminary prediction block. For example, when precision of a motion vector of the current block is integer precision, a reference block indicated by the motion vector may be determined as a preliminary prediction block.

When the motion vector for list 0 is obtained by the motion information obtainer 210, the prediction block obtainer 220 may obtain a reference block indicated by the motion vector for list 0 in a reference image included in list 0, and may obtain a preliminary prediction block for list 0 using the reference block.

In an embodiment of the disclosure, when the motion vector for list 1 is obtained by the motion information obtainer 210, the prediction block obtainer 220 may obtain a reference block indicated by the motion vector for list 1 in a reference image included in list 1, and may obtain a preliminary prediction block for list 1 using the reference block.

In an embodiment of the disclosure, when the motion vector for list 0 and the motion vector for list 1 are obtained by the motion information obtainer 210, the prediction block obtainer 220 may obtain a prediction block for list 0 using a reference block indicated by the motion vector for list 0 in a reference image included in list 0, and may obtain a prediction block for list 1 using a reference block indicated by the motion vector for list 1 in a reference image included in list 1.

Figure 4:
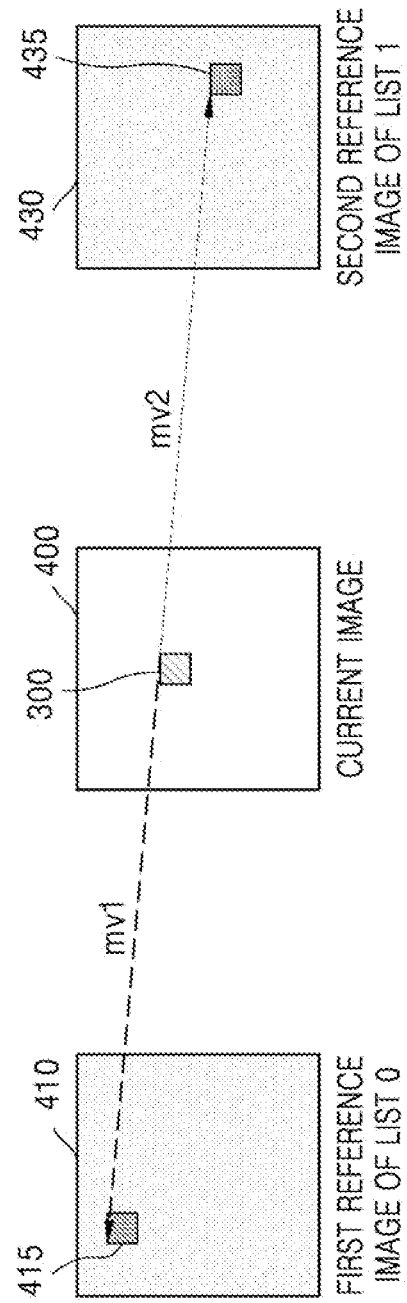
FIG. 4 is a diagram illustrating reference blocks indicated by a motion vector for list 0 and a motion vector for list 1, according to an embodiment of the disclosure.

FIG. 4 is a diagram illustrating reference blocks indicated by a motion vector for list 0 and a motion vector for list 1, according to an embodiment of the disclosure.

As shown in FIG. 4, when a motion vector mv1 for list 0 and a motion vector mv2 for list 1 are obtained for the current block 300 in a current image 400, the prediction block obtainer 220 may obtain a first reference block 415 indicated by the motion vector mv1 for list 0 in a first reference image 410 included in list 0, and may obtain a second reference block 435 indicated by the motion vector mv2 for list 1 in a second reference image 430 included in list 1. A first preliminary prediction block for list 0 may be obtained from the first reference block 415, and a second preliminary prediction block for list 1 may be obtained from the second reference block 435.

Referring back to FIG. 2, the neural network setter 230 may obtain data to be input to the neural network 240.

In an embodiment of the disclosure, the neural network setter 230 may obtain data to be input to the neural network 240 based on a reference image, a preliminary prediction block, and a quantization parameter for a reference block.

In an embodiment of the disclosure, at least one of the preliminary prediction block, a POC map, or a quantization error map may be input to the neural network 240 by the neural network setter 230.

Examples of data input to the neural network 240 are described in detail below. The preliminary prediction block, which may be for example a block determined to be similar to a current block in a rule-based prediction mode, may be used to obtain a final prediction block that is more similar to the current block.

The quantization parameter for the reference block may be used to quantize/inverse-quantize residual data of the reference block in a process of encoding/decoding the reference block. The amount of error according to quantization/inverse-quantization may vary according to the quantization parameter. For example, the quantization parameter may refer to the amount of error or distortion included in the reference block reconstructed through encoding/decoding.

Because a value calculated based on the quantization parameter may be input to the neural network 240, the neural network 240 may consider reliability of samples of the preliminary prediction block or the influence of the samples of the preliminary prediction block on samples of the final prediction block in obtaining the final prediction block from the preliminary prediction block. As described below, the neural network 240 may be trained so that a difference between a current block (or original block) for training and a final prediction block for training output based on a quantization error map for training and a preliminary prediction block for training is reduced. Accordingly, the neural network 240 may check the influence of the quantization error map for training on the final prediction block for training and may output the final prediction block for training similar to the current block for training.

The POC map may include a difference between a POC of a current image and a POC of a reference image as sample values. In embodiments, this difference may be referred to as a POC difference. A POC may indicate an image output order. Accordingly, the POC difference between the current image and the reference image may refer to an output order difference between the current image and the reference image or a temporal difference between the current image and the reference image. Because a position or a size of an object may be changed in successive images due to the object's movement, the neural network 240 may output the final prediction block more similar to the current block by being trained on a temporal difference between the current image and the reference image.

In an embodiment of the disclosure, the neural network 240 may include one or more convolution layers. The neural network 240 may output the final prediction block by processing at least one of the preliminary prediction block, the POC map, or the quantization error map input from the neural network setter 230.

As described below with reference to FIGS. 9 and 10, the neural network 240 may individually determine sample values of the final prediction block by applying a certain operation to input data. A motion vector may be calculated for each block of an image in a rule-based prediction mode, whereas samples of a final prediction block may be individually determined in a neural network-based prediction mode according to an embodiment. Therefore, the neural network 240 may consider a motion vector of the current block for each sample. Accordingly, according to the neural network-based prediction mode according to an embodiment of the disclosure, the final prediction block which may be obtained according to the neural network-based prediction mode according to an embodiment of the disclosure may be more similar to the current block than a prediction block obtained according to the rule-based prediction mode.

An example of a method of obtaining a quantization error map input to the neural network 240 is described with reference to FIGS. 5 to 8.

FIGS. 5 to 8 are diagrams for describing a method of obtaining a quantization error map based on a quantization parameter for a reference block, according to an embodiment of the disclosure.

In an embodiment of the disclosure, sample values of a quantization error map may be calculated from or based on a quantization parameter for a reference block.

The quantization parameter for the reference block may be obtained from a bitstream including information for decoding the reference block.

In an embodiment of the disclosure, the quantization error map may include quantization error values calculated based on the quantization parameter as sample values.

The quantization error values may indicate the amount of error that may be caused by quantization and inverse-quantization applied to residual samples in a process of encoding and decoding the reference block.

When a quantization error value is large, this may mean that a difference between a transform coefficient before quantization and a transform coefficient after inverse-quantization may be large. As a difference between a transform coefficient before quantization and a transform coefficient after inverse-quantization increases, sameness between an original block and a reference block obtained through decoding on encoded data may decrease.

Because errors caused by quantization and inverse-quantization may correspond to artifacts, neural network-based inter prediction may be performed by considering quantization error values.

In an embodiment of the disclosure, a quantization error value may be calculated based on Equation 1 below:

$$\text{quantization error value} = \text{quantization step size}^2/12 \quad \text{[Equation 1]}$$

Referring to Equation 1, the quantization error value may be proportional to a square of a quantization step size.

The quantization step size may be used to quantize a transform coefficient, and the transform coefficient may be quantized by dividing the transform coefficient by the quantization step size. Further, a quantized transform coefficient may be inverse-quantized by multiplying the quantized transform coefficient by the quantization step size.

The quantization step size may be approximated by Equation 2 below:

$$\text{quantization step size} = 2^{\wedge}(\text{quantization parameter}/n)/ \\ \text{quantization scale[quantization parameter} \% \ n] \quad \text{[Equation 2]}$$

In Equation 2, quantization scale[quantization parameter % n], may indicate a scale value indicated by a quantization parameter from among pre-determined n scale values. As an example, because six scale values (26214, 23302, 20560, 18396, 16384 and 14564) may be defined in an HEVC codec, n may be 6 according to the HEVC codec.

Referring to Equation 1 and Equation 2, as the quantization parameter increases, the quantization step size may increase and the quantization error value may increase.

In an embodiment of the disclosure, the quantization error map may include a quantization step size calculated based on the quantization parameter as a sample value.

Figure 5:
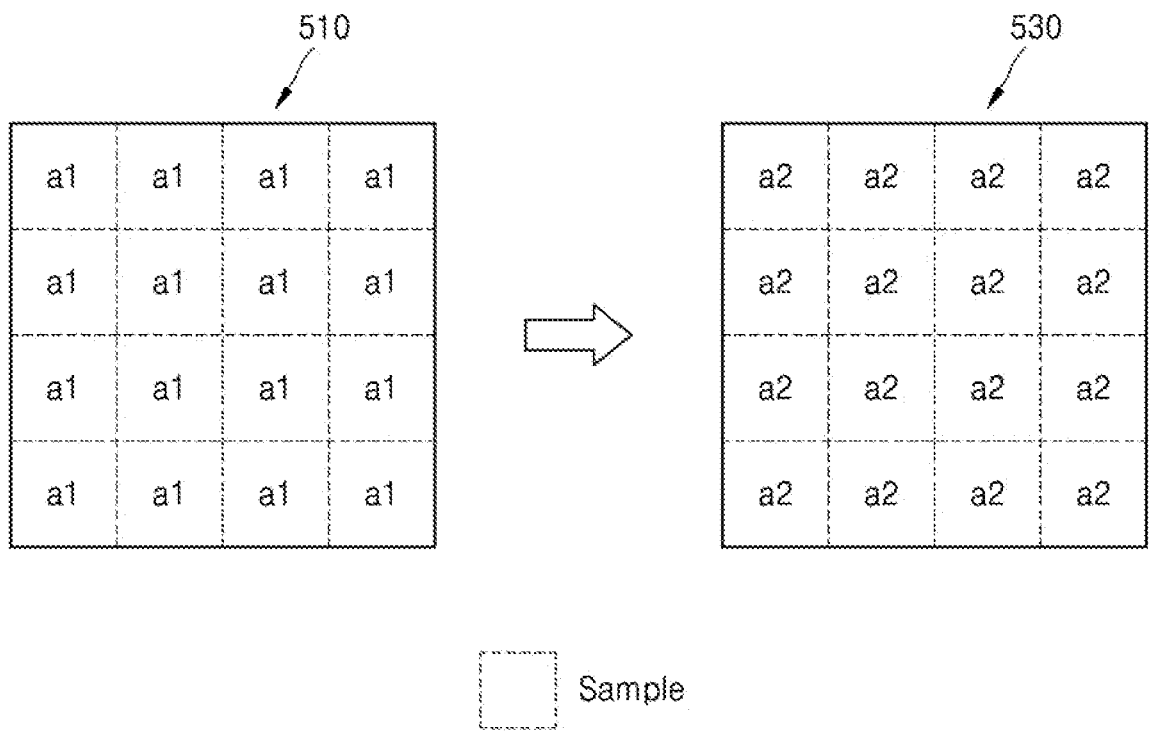
FIG. 5 is a diagram for describing a method of obtaining a quantization error map based on a quantization parameter for a reference block, according to an embodiment of the disclosure.

Referring to FIG. 5, when a reference block 510 includes 16 samples and a quantization parameter for the 16 samples is a1, sample values of a quantization error map 530 may have a2 calculated based on a1.

A quantization parameter for the reference block 510 of FIG. 5 may be set for the reference block 510, or may be set for an upper block of the reference block 510, for example, a slice including the reference block 510. In other words, the neural network setter 230 may obtain sample values of the quantization error map 530 from a quantization parameter set for the reference block 510, or a quantization parameter set for a slice including the reference block 510.

When a quantization parameter for the reference block 510 is set for an upper block of the reference block, for example, a slice including the reference block 510, the same quantization parameter may be applied to blocks included in the slice. For example, because quantization error maps of the blocks included in the slice may be obtained based on the quantization parameter set for the slice, the amount of information, or the number of pieces of information, included in a bitstream may be less than that when a quantization parameter is set for each block or each sample.

Figure 6:
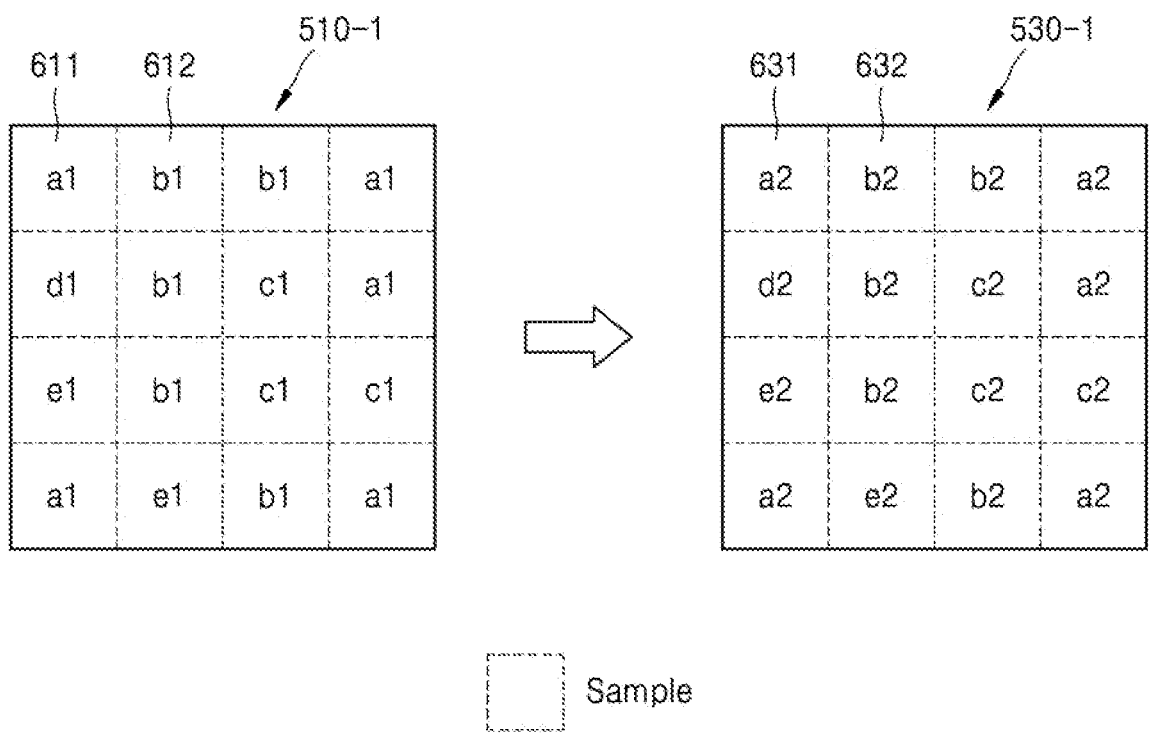
FIG. 6 is a diagram for describing a method of obtaining a quantization error map based on a quantization parameter for a reference block, according to an embodiment of the disclosure.

Next, referring to FIG. 6, a quantization parameter for a reference block 510-1 may be set for each sample of the reference block 510-1.

The neural network setter 230 may obtain sample values of a quantization error map 530-1 from the quantization parameter for each sample of the reference block 510-1.

For example, the neural network setter 230 may calculate a value of an upper left sample 631 of the quantization error map 530-1 to be a2 from a quantization parameter a1 of an upper left sample 611 of the reference block 510-1, and may calculate a value of a sample 632 located at the right of the upper left sample 631 of the quantization error map 530-1 to be b2 from a quantization parameter b1 of a sample 612 located at the right of the upper left sample 611 of the reference block 510-1.

When a quantization parameter is set for each sample of the reference block 510-1, the amount of information to be obtained from a bitstream to check the quantization parameter for the reference block 510-1 may increase. However, because a final prediction block of a current block may be obtained using the reference block 510-1 having a small error, the number of bits for expressing a residual block between the current block and the final prediction block may be reduced.

Figure 7:
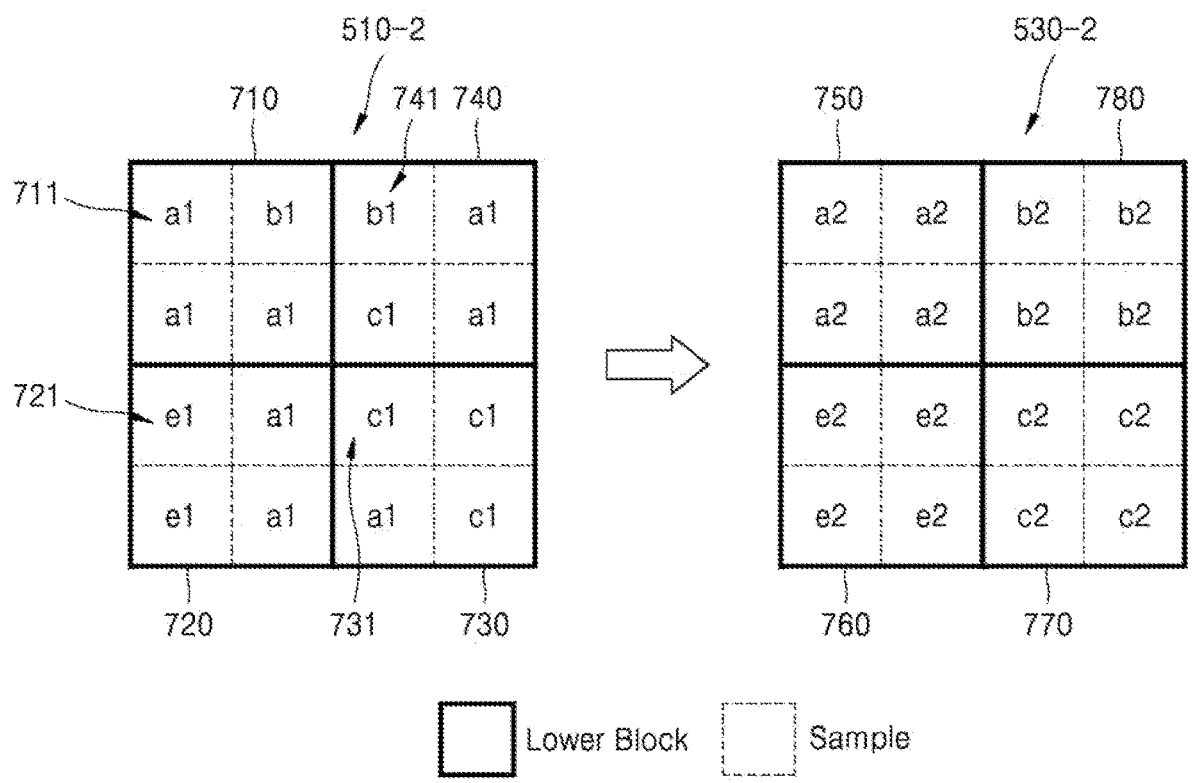
FIG. 7 is a diagram for describing a method of obtaining a quantization error map based on a quantization parameter for a reference block, according to an embodiment of the disclosure.

Next, referring to FIG. 7, the neural network setter 230 may divide a quantization error map 530-2 into sub-areas, for example first sub-area 750, second sub-area 760, third sub-area 770, and fourth sub-area 780 corresponding to lower blocks, which may include for example first lower block 710, second lower block 720, third lower block 730, and fourth lower block 740 of a reference block 510-2, and may calculate sample values respectively included in the sub-areas 750 to 780 of the quantization error map 530-2, from a quantization parameter for a sample at a certain position in the lower blocks 710, 720, 730, and 740 of the reference block 510-2.

In an embodiment of the disclosure, when the reference block 510-2 corresponds to a coding unit, the lower blocks 710, 720, 730, and 740 may correspond to prediction units.

In an embodiment of the disclosure, the certain position may include an upper left position in a lower block.

As shown in FIG. 7, sample values of the first sub-area 750 of the quantization error map 530-2 may have a2 calculated based on a quantization parameter a1 for a sample 711 at an upper left position from among samples of the first lower block 710 in the reference block 510-2.

Also, sample values of the second sub-area 760 of the quantization error map 530-2 may have e2 calculated based on a quantization parameter e1 fora sample 721 at an upper left position from among samples of the second lower block 720 in the reference block 510-2.

Also, sample values of the third sub-area 770 of the quantization error map 530-2 may have c2 calculated based on a quantization parameter c1 for a sample 731 at an upper left position from among samples of the third lower block 730 in the reference block 510-2, and sample values of the fourth sub-area 780 of the quantization error map 530-2 may have b2 calculated based on a quantization parameter b1 for a sample 741 at an upper left position from among samples of the fourth lower block 740 of the reference block 510-2.

For example, a sample at a certain position may include a sample at a central position in a lower block. When a width and a height of a certain area are divided in half, a sample at a central position may refer to a sample located at a lower left position, a sample located at an upper left position, a sample located at a lower right position, or a sample located at an upper right position.

Figure 8:
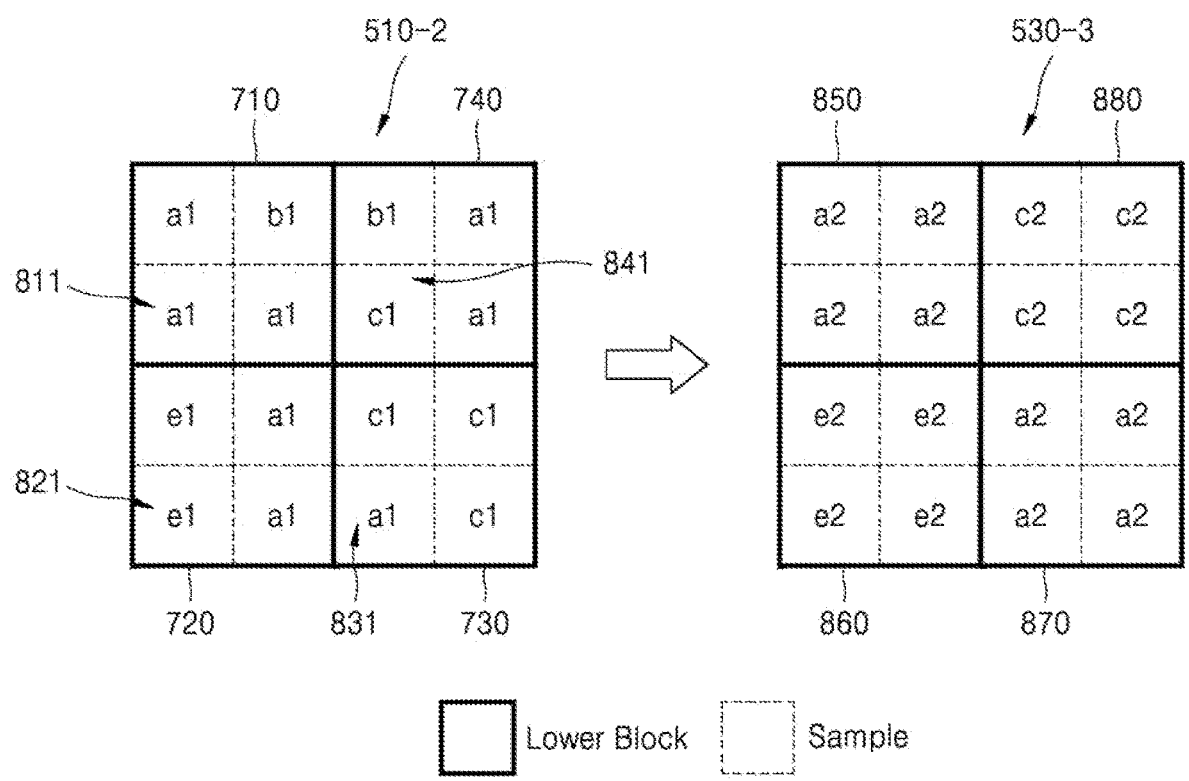
FIG. 8 is a diagram for describing a method of obtaining a quantization error map based on a quantization parameter for a reference block, according to an embodiment of the disclosure.

FIG. 8 illustrates an example in which a sample at a central position is a sample located at a lower left position when a width and a height of a certain area are divided in half.

As shown in FIG. 8, sample values of a first sub-area 850 of a quantization error map 530-3 may have a2 calculated based on a quantization parameter a1 for a sample 811 at a central position from among samples of the first lower block 710 in the reference block 510-2.

Also, sample values of a second sub-area 860 of the quantization error map 530-3 may have 2e calculated based on a quantization parameter e1 for a sample 821 at a central position from among samples of the second lower block 720 in the reference block 510-2.

Also, sample values of a third sub-area 870 of the quantization error map 530-3 may have a2 calculated based on a quantization parameter a1 for a sample 831 at a central position from among samples of the third lower block 730 in the reference block 510-2, and sample values of a fourth sub-area 880 of the quantization error map 530-3 may have c2 calculated based on a quantization parameter c1 for a sample 841 at a central position from among samples of the fourth lower block 740 in the reference block 510-2.

A sample at an upper left position and a sample at a central position described with reference to FIGS. 7 and 8 are merely examples, and in an embodiment of the disclosure, a specific position in the lower blocks 710, 720, 730, and 740 for obtaining sample values of sub-areas of the quantization error maps 530-2 and 530-3 may be changed in various ways.

When a quantization parameter for a reference block is set for each lower block or each sample, because sample values of sub-areas of the quantization error maps 530-2 and 530-3 are calculated based on a quantization parameter for a sample at a certain position in the lower blocks 710, 720, 730, and 740 of the reference block 510-2 as in an embodiment with reference to FIGS. 7 and 8, the quantization error maps 530-2 and 530-3 may be obtained more rapidly.

In an embodiment of the disclosure, the neural network setter 230 may select any one of different methods of obtaining a quantization error map (e.g., methods of obtaining a quantization error map of FIGS. 5 to 8), based on at least one of a size of a current block, a prediction direction of the current block, a layer to which a current image belongs in a hierarchical structure of an image, or information obtained from a bitstream (e.g., a flag or an index), and may obtain a quantization error map according to the selected method.

As described above, a final prediction block may be obtained based on at least one of a preliminary prediction block, a quantization error map, or a POC map being input to the neural network 240. An example of a structure of the neural network 240 is described with reference to FIG. 9.

Figure 9:
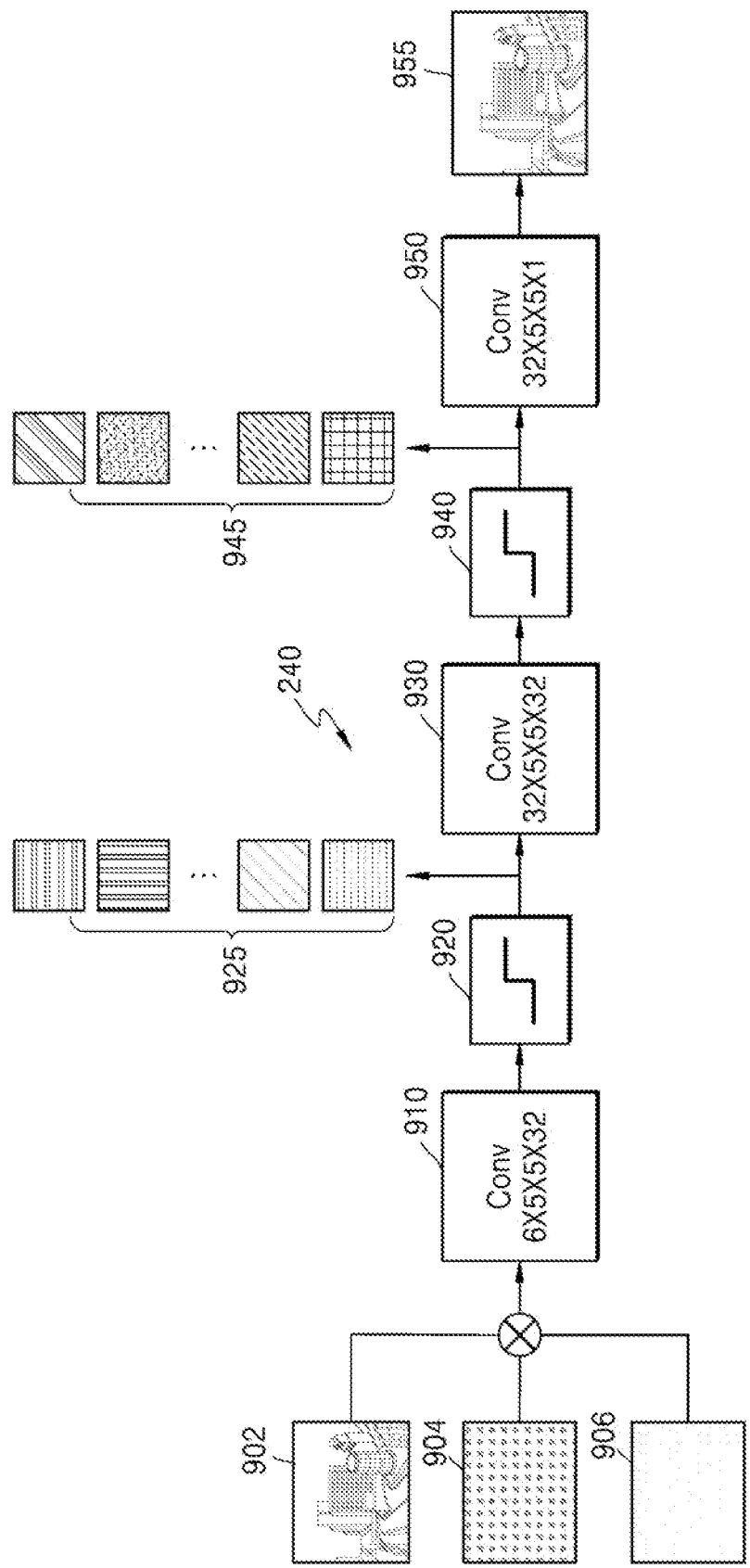
FIG. 9 is a diagram illustrating a structure of a neural network, according to an embodiment of the disclosure.

FIG. 9 is a diagram illustrating a structure of the neural network 240, according to an embodiment of the disclosure.

As shown in FIG. 9, a preliminary prediction block 902, a quantization error map 904, and a POC map 906 may be input to a first convolution layer 910.

In an embodiment of the disclosure, sizes of the preliminary prediction block 902, the quantization error map 904, and the POC map 906 may be the same as a size of a current block.

Because the POC map 906 may include a POC difference between a current image and a reference image as sample values, sample values in the POC map 906 may all be the same.

The notation 6×5×5×32 shown in the first convolution layer 910 of FIG. 9 may indicate that a convolution operation is performed using 32 filter kernels with a size of 5×5 on input data having six channels. As a result of the convolution operation, 32 feature maps may be generated by the 32 filter kernels.

When the first convolution layer 910 processes input data having six channels, the processing may be performed by considering that the current block is bi-directionally predicted.

In an embodiment of the disclosure, when the current block is bi-directionally predicted, a first motion vector for list 0 and a second motion vector for list 1 may be derived for the current block, and a first reference image included in list 0 and a second reference image included in list 1 may be obtained as the reference image of the current block.

Also, a first preliminary prediction block may be obtained from a first reference block in the first reference image indicated by the first motion vector for list 0, and a second preliminary prediction block may be obtained from a second reference block in the second reference image indicated by the second motion vector for list 1. For example, as data input to the neural network 240, the first preliminary prediction block, the second preliminary prediction block, a first quantization error map including sample values calculated based on a quantization parameter for the first reference block, a second quantization error map including sample values calculated based on a quantization parameter for the second reference block, a first POC map including a POC difference between the current image and the first reference image, and a second POC map including a POC difference between the current image and the second reference image may be obtained.

The first convolution layer 910 may perform a convolution operation on the first preliminary prediction block, the second preliminary prediction block, the first quantization error map, the second quantization error map, the first POC map, and the second POC map using 32 filter kernels with a size of 5×5.

When unidirectional prediction, for example, list 0 prediction or list 1 prediction, is applied to the current block, for example when only the first motion vector for list 0 is obtained or only the second motion vector for list 1 is obtained for the current block, only input data having three channels may be obtained. Because the number of channels that may be processed by the first convolution layer 910 of FIG. 9 is 6, the input data having three channels may be increased to input data having six channels.

The neural network setter 230 may copy the first preliminary prediction block (or for example the second preliminary prediction block), the first quantization error map (or for example the second quantization error map), and the first POC map (or for example the second POC map) to obtain two first preliminary prediction blocks (or two second preliminary prediction blocks), two first quantization error maps (or two second quantization error maps), and two first POC maps (or two second POC maps), and may input the input data having six channels to the neural network 240.

Feature maps generated by the first convolution layer 910 may represent unique features of input data. For example, the feature maps may represent features in a vertical direction, features in a horizontal direction, or edge features of the input data.

An example of a convolution operation at the first convolution layer 910 is described in detail with reference to FIG. 10.

One feature map 1030 may be generated based on multiplication and addition between weights of a filter kernel 1010 with a size of 5×5 used in the first convolution layer 910 and sample values in input data 1005 (e.g., the preliminary prediction block 902) corresponding to the weights.

Because 32 filter kernels may be used in the first convolution layer 910, 32 feature maps may be generated through convolution operations using the 32 filter kernels.

Figure 10:
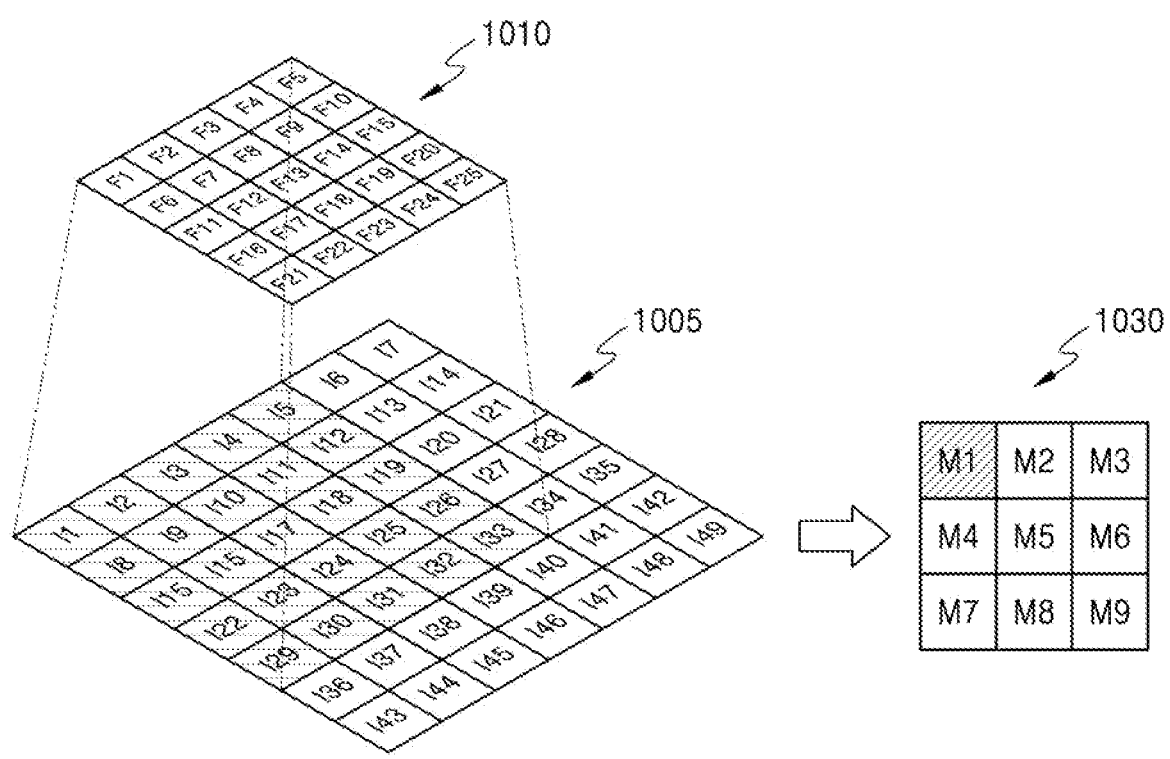
FIG. 10 is a diagram for describing a convolution operation at a convolution layer, according to an embodiment of the disclosure.

Samples I1 to I49 shown in the input data 1005 in FIG. 10 may represent samples of the input data 1005, and samples F1 to F25 shown in the filter kernel 1010 may represent samples of the filter kernel 1010. Also, samples M1 to M9 shown in the feature map 1030 may represent samples of the feature map 1030.

During a convolution operation, multiplication may be performed between values of the samples I1 to I5, I8 to I12, I15 to I19, I22 to I26, and I29 to I33 of the input data 1005 and the samples F1 to F25 of the filter kernel 1010, and a value obtained by combining (e.g., adding) results of the multiplication may be assigned as a value of M1 of the feature map 1030.

When a stride of the convolution operation is 1, multiplication may be performed between values of the samples I2 to I6, I9 to I13, I16 to I20, I23 to I27, and I30 to I34 of the input data 1005 and the samples F1 to F25 of the filter kernel 1010, and a value obtained by combining results of the multiplication may be assigned as a value of M2 of the feature map 1030.

When the convolution operation is performed between values of the samples in the input data 1005 and the samples of the filter kernel 1010 while the filter kernel 1010 moves by the stride to a last sample in the input data 1005, the feature map 1030 having a certain size may be obtained.

Although FIG. 10 illustrates convolution layers included in the neural network 240 as performing operations according to a convolution operation, the convolution operation described with reference to FIG. 10 is merely an example and embodiments of the disclosure are not limited thereto.

Referring back to FIG. 9, the feature maps of the first convolution layer 910 may be input to a first activation layer 920.

The first activation layer 920 may apply non-linear features to each feature map. The first activation layer 920 may include, but is not limited to, at least one of a sigmoid function, a Tanh function, or a rectified linear unit (ReLU) function.

When the first activation layer 920 applies non-linear features, this may mean that some sample values of feature maps are changed and output. In this case, the changing may be performed by applying the non-linear features.

The first activation layer 920 may determine whether to transmit sample values of the feature maps to a second convolution layer 930. For example, some of the sample values of the feature maps may be activated by the first activation layer 920 and may be transmitted to the second convolution layer 930, and other sample values may be deactivated by the first activation layer 920 and may not be transmitted to the second convolution layer 930. Unique features of input data indicated by the feature maps may be emphasized by the first activation layer 920.

Feature maps 925 output from the first activation layer 920 may be input to the second convolution layer 930. Any one of the feature maps 925 of FIG. 9 may be a result of processing the feature map 1030 described with reference to FIG. 10 at the first activation layer 920.

The notation 32×5×5×32 shown in the second convolution layer 930 may indicate that a convolution operation is performed on the feature maps 925 having 32 channels using 32 filter kernels with a size of 5×5. An output of the second convolution layer 930 may be input to a second activation layer 940. The second activation layer 940 may apply non-linear features to input feature maps.

Feature maps 945 output from the second activation layer 940 may be input to a third convolution layer 950. The notation 32×5×5×1 shown in the third convolution layer 950 may indicate that a convolution operation is performed on the 32 feature maps 945 to generate one final prediction block 955 using one filter kernel with a size of 5×5.

Although FIG. 9 illustrates the neural network 240 as including three convolution layers (the first convolution layer 910, the second convolution layer 930, and the third convolution layer 950) and two activation layers (the first activation layer 920 and the second activation layer 940), this is merely an example, and embodiments are not limited thereto. For example, in embodiments the number of convolution layers and activation layers included in the neural network 240 may be changed in various ways.

Also, according to an embodiment of the disclosure, the neural network 240 may be implemented through a recurrent neural network (RNN). In this case, a CNN structure of the neural network 240 of FIG. 9 may be changed into an RNN structure.

In an embodiment of the disclosure, the image decoding apparatus 100 and the image encoding apparatus 1900 may include at least one arithmetic logic unit (ALU) for a convolution operation and an arithmetic operation at each activation operation.

The ALU may be implemented as, by, or using a processor. For the convolution operation, the ALU may include a multiplier that performs multiplication between sample values of input data or a feature map output from a previous layer and sample values of a filter kernel, and an adder that adds results of the multiplication.

For the arithmetic operation at each activation layer, the ALU may include a multiplier that multiplies an input sample value by a pre-determined weight used in at least one of a sigmoid function, a Tanh function, or an ReLU function, and a comparator that compares a result of the multiplication with a certain value to determine whether to transmit the input sample value to a next layer.

According to the convolution operation of FIG. 10, the feature map 1030 with a size of 3×3 may be obtained when the filter kernel 1010 with a size of 5×5 is applied to the input data 1005 with a size of 7×7.

In general, when a convolution operation is performed on input data that is not padded, output data with a smaller size than the input data is output. Accordingly, in order to match a size of the final prediction block to a size of the current block, padding may be performed on the input data.

In an embodiment of FIG. 10, in order to obtain the feature map 1030 with the same size as a size of the input data 1005, padding may be performed by a distance of 2 in a left direction, a right direction, an upper direction, and a lower direction of the input data 1005.

In an embodiment of the disclosure, in order to obtain a final prediction block with the same size as a size of the current block, the neural network setter 230 may pad at least one of a preliminary prediction block, a quantization error map, or a POC map, and may input at least one of an enlarged preliminary prediction block, an enlarged quantization error map, or an enlarged POC map obtained through the padding to the neural network 240.

In an embodiment of the disclosure, before a convolution operation is performed on input data in each convolution layer of the neural network 240 or data output from a previous layer, the input data or the data output from the previous layer may be added, and thus, a size of data before the convolution operation and a size of data after the convolution operation may remain the same. Accordingly, even when at least one of the enlarged preliminary prediction block, the enlarged quantization error map, or the enlarged POC map is input to the neural network 240, a size of the final prediction block output from the neural network 240 may be the same as a size of at least one of the enlarged preliminary prediction block, the enlarged quantization error map, or the enlarged POC map. In this case, in an embodiment of the disclosure, the final prediction block may be cropped so that a size of the final prediction block output from the neural network 240 is the same as a size of the current block.

In an embodiment of the disclosure, the neural network setter 230 may calculate an enlarged distance for padding based on the number of convolution layers included in the neural network 240, a size of a filter kernel used in each convolution layer, and a stride.

In an embodiment of the disclosure, when a size of a kernel used in each convolution layer included in the neural network 240 is $k_i$ (where i=0, 1, ..., L−1) and a stride in each convolution layer is $s_i$ (where i=0, 1, ..., L−1), an enlarged distance may be calculated according to Equation 3 below:

$$h = \left\{(M-1)\prod_{i=0}^{L-1} s_i + \sum_{i=0}^{L-1}(k_i - 1)\prod_{j=0}^{i} s_j - 1\right\} - M \quad \text{[Equation 3]}$$

$$v = \left\{(N-1)\prod_{i=0}^{L-1} s_i + \sum_{i=0}^{L-1}(k_i - 1)\prod_{j=0}^{i} s_j - 1\right\} - N$$

In Equation 3, h may denote an enlarged distance in a horizontal direction, v denotes an enlarged distance in a vertical direction, M may denote a size of input data in a horizontal direction, and N may denote a size of input data in a vertical direction.

When sizes of filter kernels used in convolution layers included in the neural network 240 are all the same as k and strides in the convolution layers are all s, Equation 3 may be modified into Equation 4:

$$h = \left\{(M-1)s^L + \sum_{i=0}^{L-1}(k-1)s^i - 1\right\} - M \quad \text{[Equation 4]}$$

$$v = \left\{(N-1)s^L + \sum_{i=0}^{L-1}(k-1)s^i - 1\right\} - N$$

The neural network setter 230 may determine an enlarged distance in a horizontal direction and an enlarged distance in a vertical direction for padding of a preliminary prediction block, a quantization error map, and a POC map based on Equation 3 or Equation 4, and may obtain an enlarged preliminary prediction block, an enlarged quantization error map, and an enlarged POC map further including samples corresponding to the enlarged distances.

In an embodiment of the disclosure, when an enlarged distance in a horizontal direction and an enlarged distance in a vertical direction are 1, the neural network setter 230 may obtain an enlarged preliminary prediction block by adding samples which are enlarged by the enlarged distance of 1 in a left direction and a right direction from a preliminary prediction block and adding samples which are enlarged by the enlarged distance of 1 in an upper direction and a lower direction of the preliminary prediction block.

In an embodiment of the disclosure, in order to obtain an enlarged preliminary prediction block, an enlarged quantization error map, and an enlarged POC map, the neural network setter 230 may add a sample of a pre-determined value outside a boundary of the preliminary prediction block, the quantization error map, and the POC map. For example, the pre-determined value may be 0.

In an embodiment of the disclosure, considering that a preliminary prediction block may be obtained from a reference block that is a part in a reference image, the neural network setter 230 may consider neighboring samples of the reference block when padding the preliminary prediction block, a quantization error map, and a POC map. For example, using samples adjacent to the reference block instead of padding the preliminary prediction block according to a pre-determined sample value, spatial characteristics of the reference image may also be considered in inter-predicting a current block.

Figure 11:
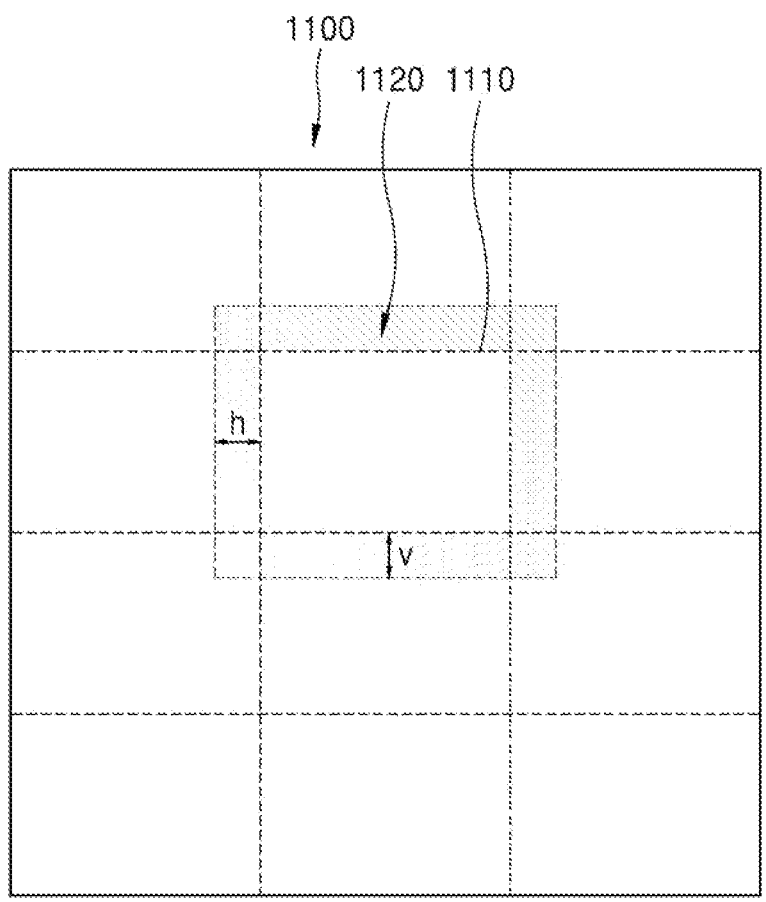
FIG. 11 is a diagram for describing a method of obtaining an enlarged preliminary prediction block, according to an embodiment of the disclosure.

FIG. 11 is a diagram for describing a method of obtaining an enlarged preliminary prediction block, according to an embodiment of the disclosure.

As shown in FIG. 11, when an enlarged distance in a horizontal direction is h and an enlarged distance in a vertical direction is v, the neural network setter 230 may obtain an enlarged preliminary prediction block including samples of a preliminary prediction block and samples 1120 corresponding to the enlarged distance h from among samples adjacent to a reference block 1110 in a reference image 1100. Accordingly, a horizontal distance of the enlarged preliminary prediction block may be greater by 2h than the preliminary prediction block, and a vertical distance of the enlarged preliminary prediction block may be greater by 2v than the preliminary prediction block.

Figure 12:
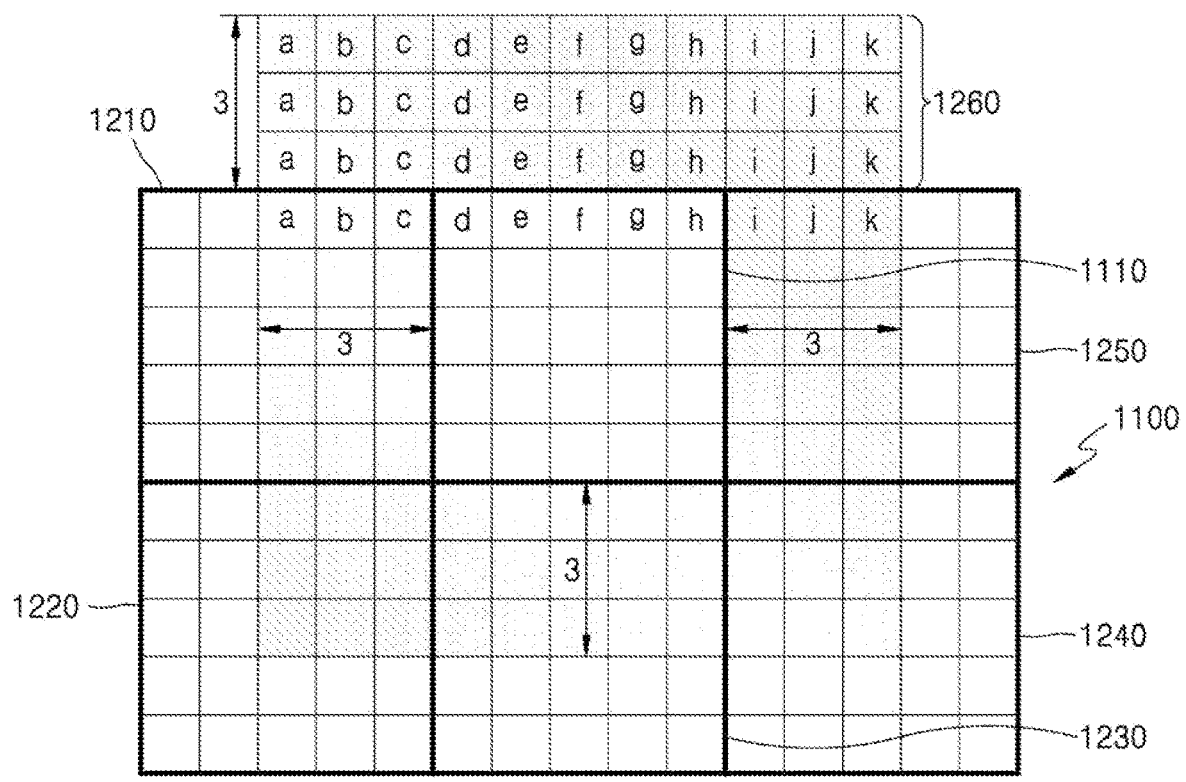
FIG. 12 is a diagram for describing a method of obtaining an enlarged preliminary prediction block, when a boundary of a reference block corresponds to a boundary of a reference image, according to an embodiment of the disclosure.

FIG. 12 is a diagram for describing a method of obtaining an enlarged preliminary prediction block, when a boundary of the reference block 1110 corresponds to a boundary of the reference image 1100, according to an embodiment of the disclosure.

When an enlarged distance in a horizontal direction and an enlarged distance in a vertical direction are determined to be 3, the neural network setter 230 may obtain an enlarged preliminary prediction block including samples in a preliminary prediction block and neighboring samples located within the enlarged distance of 3 from among neighboring samples located outside a boundary of the reference block 1110.

As shown in FIG. 12, when the reference image 1100 is divided into six blocks (for example left block 1210, lower left block 1220, lower block 1230, lower right block 1240, right block 1250, and reference block 1110) and a block located at an upper central position is the reference block 1110, the neural network setter 230 may select neighboring blocks located within the enlarged distance of 3 from a left boundary of the reference block 1110 while being located in a left block 1210 of the reference block 1110, neighboring samples located within the enlarged distance of 3 from a right boundary of the reference block 1110 while being located in a right block 1250 of the reference block 1110, and neighboring samples located within the enlarged distance of 3 from a lower boundary of the reference block 1110 while being located in a lower block 1230 of the reference block 1110. In this case, in order to determine an enlarged preliminary prediction block having a quadrangular shape, neighboring samples located in a lower left block 1220 of the reference block 1110 and neighboring samples located in a lower right block 1240 of the reference block 1110 may also be selected.

In an embodiment of the disclosure, when a boundary of the reference block 1110 matches a boundary of the reference image 1100, for example, when an upper boundary of the reference block 1110 matches an upper boundary of the reference image 1100 as shown in FIG. 10, neighboring samples located outside the upper boundary of the reference block 1110 may not be included in the reference image 1100. Accordingly, the neural network setter 230 may determine neighboring samples 1260 located outside the upper boundary of the reference block 1110 using samples in the reference image 1100 closest to each of the neighboring blocks 1260 located outside the upper boundary of the reference block 1110.

Referring to FIG. 10, values of neighboring samples located in a leftmost column from among the neighboring samples 1260 located outside the upper boundary of the reference block 1110 may be determined to be a value a of a closest sample in the adjacent block 1210, and values of neighboring samples located in a rightmost column from among the neighboring samples 1260 may be determined to be a value k of a closest sample in the adjacent block 1250.

The neural network setter 230 may apply an enlarged preliminary prediction block with a size of 11×11, which may be larger than the reference block 1110 (and preliminary prediction block) with a size of 5×5, to the neural network 240, and may obtain a final prediction block with a size of 5×5 that is the same as a size of the current block.

Because a size of a quantization error map input to the neural network 240 may be the same as a size of the enlarged preliminary prediction block, when the enlarged preliminary prediction block is input to the neural network 240, the neural network setter 230 may obtain an enlarged quantization error map with the same size as a size of the enlarged preliminary prediction block, an example of which is described with reference to FIG. 13.

Figure 13:
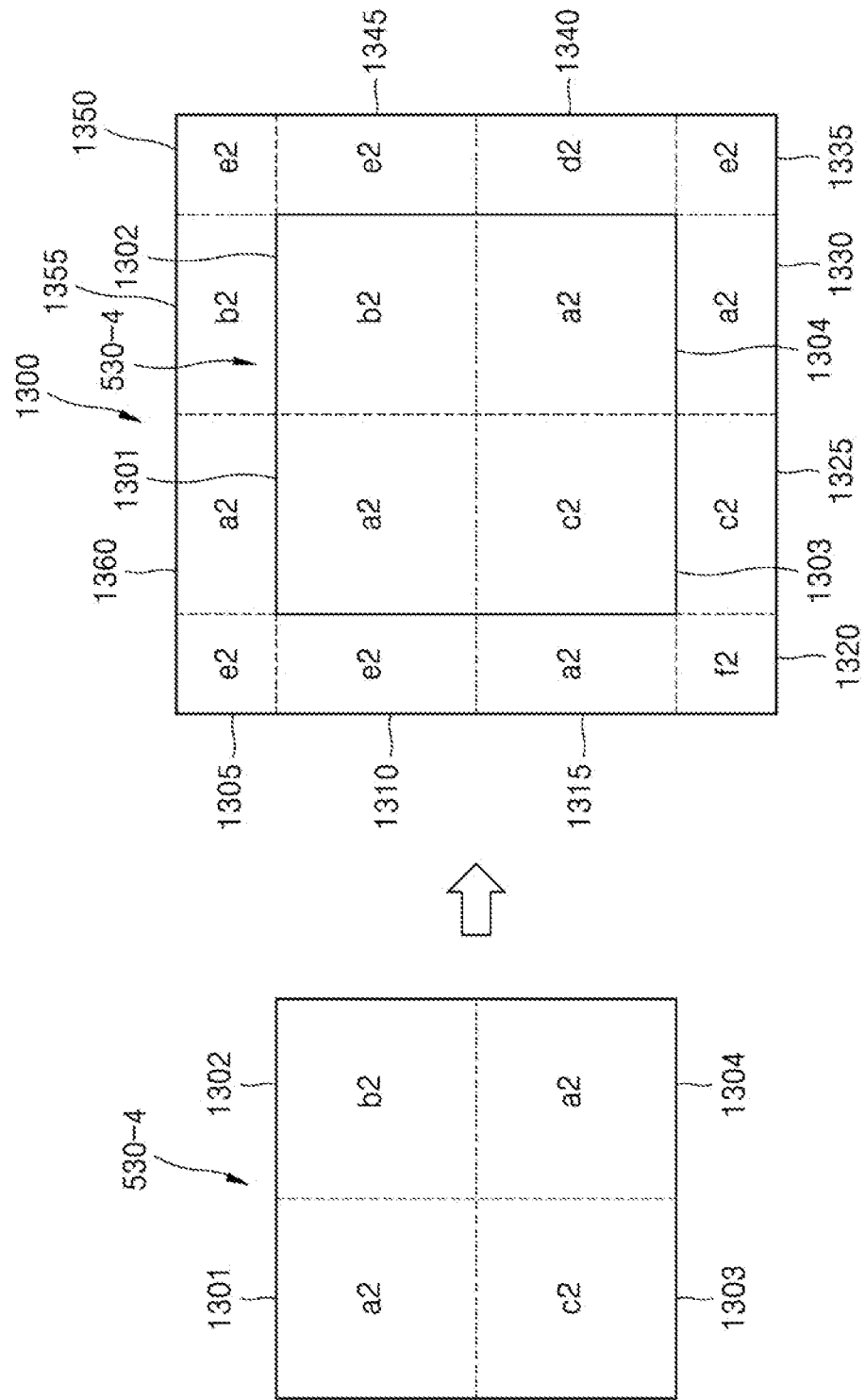
FIG. 13 is a diagram for describing a method of obtaining an enlarged quantization error map, according to an embodiment of the disclosure.

FIG. 13 is a diagram for describing a method of obtaining an enlarged quantization error map 1300, according to an embodiment of the disclosure.

FIG. 13 illustrates a quantization error map 530-4 including four samples, and the enlarged quantization error map 1300 that is enlarged according to an enlarged distance of 1.

When quantization parameters for four samples included in a reference block are respectively a1, b1, c1, and a1, a first sample 1301 to a fourth sample 1304 in the quantization error map 530-4 may have sample values of a2, b2, c2, and a2.

When samples in a preliminary prediction block and neighboring samples adjacent to the reference block constitute an enlarged preliminary prediction block, values of neighboring samples outside the quantization error map 530-4 may be determined according to a quantization parameter for neighboring samples located outside a boundary of the reference block.

As in FIG. 13, a left sample 1310 of the first sample 1301 may have a value of e2, and a left sample 1315 of the third sample 1303 may have a value of a2. Here, e2 and a2 may be respectively calculated based on a quantization parameter for a sample located at the left of a sample corresponding to the first sample 1301 in the reference block and a quantization parameter located at the left of a sample corresponding to the third sample 1303.

Also, a lower left sample 1320 of the third sample 1303 may have a value of f2, a lower sample 1325 of the third sample 1303 may have a value of c2, and a lower sample 1330 of the fourth sample 1304 may have a value of a2. Also, a lower right sample 1335 of the fourth sample 1304 may have a value of e2, a right sample 1340 of the fourth sample 1304 may have a value of d2, and a right sample 1345 of the second sample 1302 may have a value of e2.

As described with reference to FIG. 12, when a boundary (e.g., an upper boundary) of the reference block 1110 corresponds to a boundary of the reference image 1100, the neighboring samples 1260 located outside the boundary of the reference block 1110 may be determined from closest samples available to the neighboring samples 1260. Similarly, values of neighboring samples located outside a boundary of the quantization error map 530-4 may be determined closest samples available to the neighboring samples.

When an upper boundary of the reference block corresponds to a boundary of the reference image, as shown in FIG. 13, samples 1305, 1360, 1355, and 1350 located outside an upper boundary of the quantization error map 530-4 may have values of e2, a2, b2, and e2. For example, the sample 1305 located on an upper left side of the first sample 1301 may be determined from the left sample 1310 of the first sample 1301 which is the closest, and the sample 1360 located above the first sample 1301 may be determined from the first sample 1301 that is the closest. Also, the sample 1355 located above the second sample 1302 may be determined from the second sample 1302 that is the closest, and the sample 1350 located on an upper right side of the second sample 1302 may be determined from the right sample 1345 of the second sample 1302 which is the closest.

In an embodiment of the disclosure, because sample values in a POC map correspond to a POC difference between a current image and a reference image, when the POC map is padded according to an enlarged distance, sample values in an enlarged POC map may all have the POC value between the current image and the reference image.

In an embodiment of the disclosure, when there are samples reconstructed before a current block in the current image, a block including the samples may be further input to the neural network 240, an example of which is described with reference to FIGS. 14 and 15.

Figure 14:
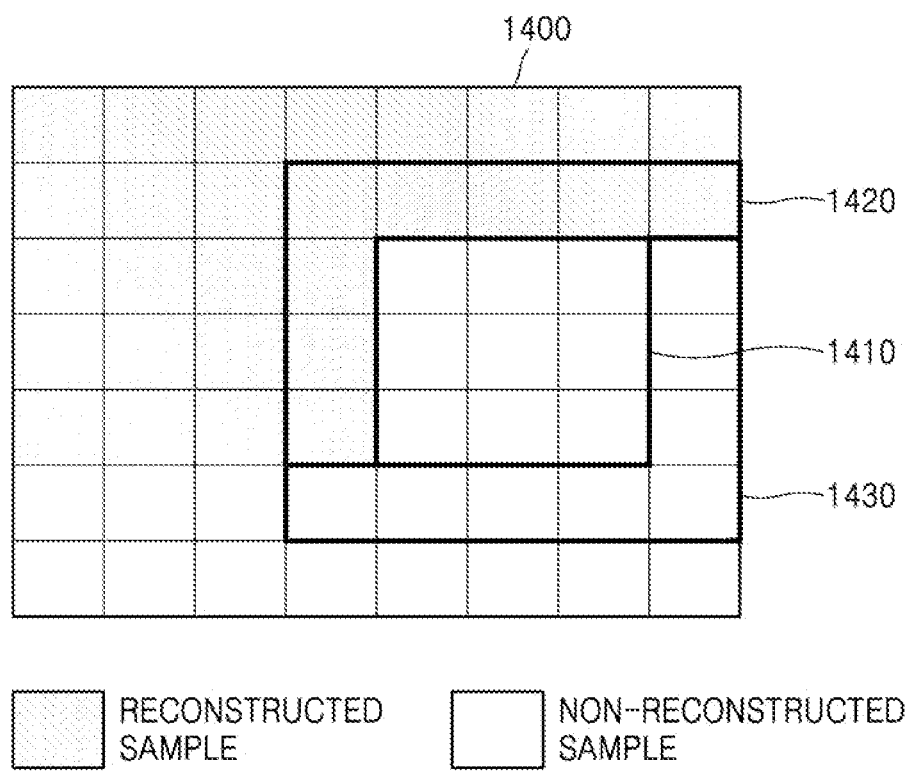
FIG. 14 is a diagram illustrating reconstructed samples and non-reconstructed samples in a current image, according to an embodiment of the disclosure.

FIG. 14 is a diagram illustrating reconstructed samples and non-reconstructed samples in a current image 1400, according to an embodiment of the disclosure.

The current image 1400 may be reconstructed according to a pre-determined scan order. For example, blocks and samples in the current image 1400 may be reconstructed according to a raster scan.

As shown in FIG. 14, when the current image 1400 is reconstructed according to a raster scan, samples located on a left side of a current block 1410 and samples located above the current block 1410 may have been reconstructed before the current block 1410 is reconstructed.

Because the samples that have been reconstructed before the current block 1410 are spatially adjacent to the current block, information useful to generate a final prediction block similar to the current block 1410 may be provided to the neural network 240.

In an embodiment of the disclosure, when the neural network setter 230 inputs at least one of an enlarged preliminary prediction block, an enlarged quantization error map, or an enlarged POC map to the neural network 240, the neural network setter 230 may also input, to the neural network 240, an enlarged current reconstructed block with the same size as a size of at least one of the enlarged preliminary prediction block, the enlarged quantization error map, or the enlarged POC map.

The enlarged current reconstructed block may include samples corresponding to an enlarged distance from among samples reconstructed before the current block 1410.

Referring to FIG. 14, when an enlarged distance is 1, the neural network setter 230 may obtain an enlarged current reconstructed block using samples 1420 located at the enlarged distance 1 from a boundary of the current block 1410 from among samples reconstructed before the current block 1410.

Figure 15:
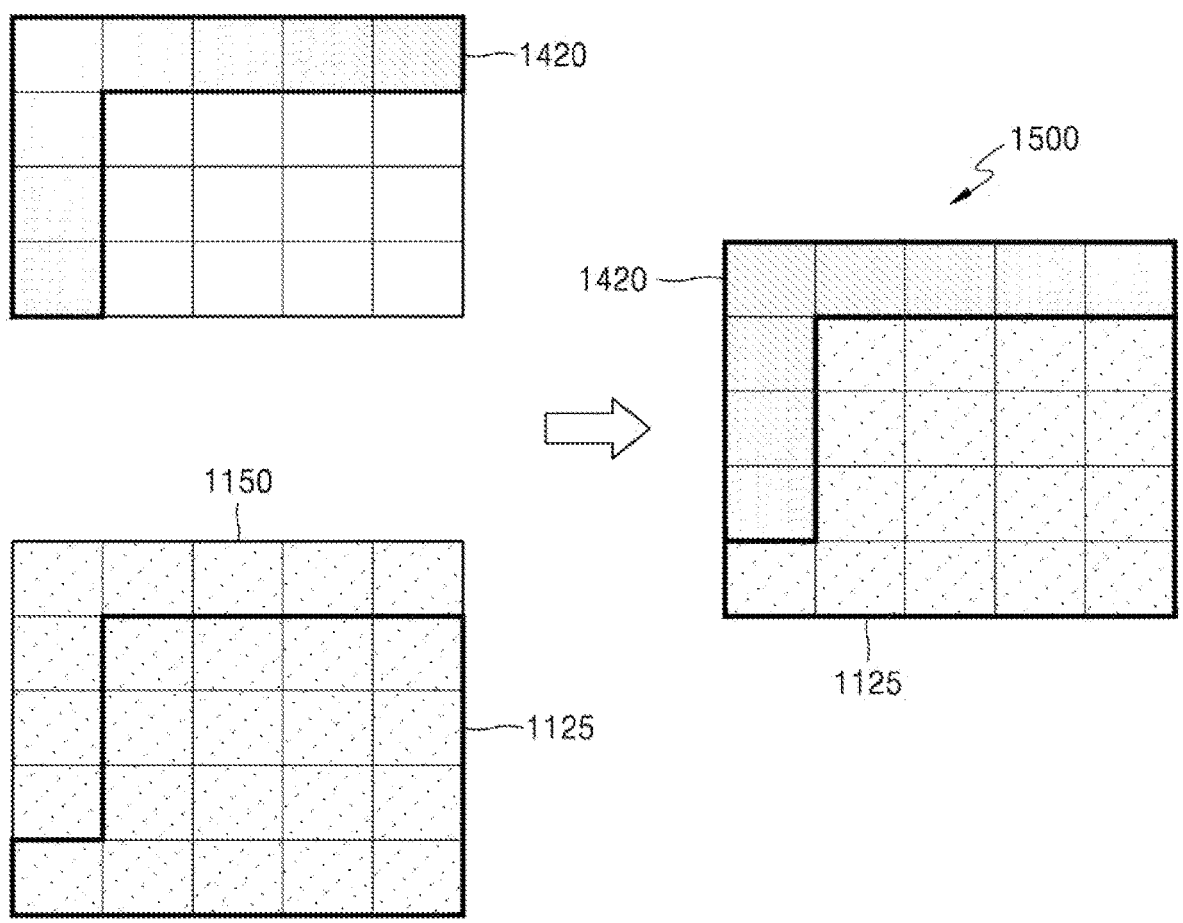
FIG. 15 is a diagram for describing a method of obtaining an enlarged current reconstructed block, according to an embodiment of the disclosure.

In the example illustrated in FIG. 14, because the samples 1420 corresponding to the enlarged distance 1 in a left direction and an upper direction of the current block 1410 have been reconstructed but samples in the current block 1410 and samples 1430 corresponding to the enlarged distance 1 in a right direction and a lower direction of the current block 1410 are not reconstructed, the neural network setter 230 may obtain the samples that are not reconstructed based on the enlarged preliminary prediction block, an example of which is described with reference to FIG. 15.

FIG. 15 is a diagram for describing a method of obtaining an enlarged current reconstructed block 1500, according to an embodiment of the disclosure.

Referring to FIG. 15, the enlarged current reconstructed block 1500 including samples 1420 that have been reconstructed before the current block 1410 and samples 1125 other than samples corresponding to the samples 1420 that have been reconstructed before the current block from among samples of an enlarged preliminary prediction block 1150 may be obtained.

In an embodiment of the disclosure, when there are two enlarged preliminary prediction blocks because a current block is bi-directionally predicted, the enlarged preliminary prediction block 1150 of FIG. 15 may include average values of sample values of the two enlarged preliminary prediction blocks as sample values.

Because the enlarged current reconstructed block 1500 may be processed by the neural network 240 together with an enlarged preliminary prediction block, an enlarged quantization error map, and an enlarged POC map, spatial characteristics in a current image may also be considered.

In an embodiment of the disclosure, the neural network setter 230 may select any one of a plurality of weight sets according to a certain criterion, and may allow the neural network 240 to operate according to the selected weight set.

Each of the plurality of weight sets may include a weight used in an operation process of a layer included in the neural network 240.

In an embodiment of the disclosure, the neural network setter 230 may select a weight set to be used to obtain a final prediction block from among the plurality of weight sets, based on at least one a size of a current block, a prediction direction of the current block, a quantization parameter for a reference block, a layer to which a current image belongs in a hierarchical structure of an image, or information obtained from a bitstream.

Referring to FIG. 16, the neural network setter 230 may obtain a final prediction block which is more similar to a current block by setting a weight set indicated by an index obtained from a bitstream from among a weight set A, a weight set B, and a weight set C, to the neural network 240.

Although FIG. 16 illustrates an example in which a weight set is selected based on information obtained, embodiments are not limited thereto. For example, in an embodiment of the disclosure, a weight set to be used to obtain a final prediction block may be selected from among the plurality of weight sets according to a result of comparing a size of the current block with a pre-determined threshold value.

For example, when a size of the current block is equal to or greater than 64×64, the weight set C may be selected; when a size of the current block is equal to or greater than 16×16 and less than 64×64, the weight set B may be selected; and when a size of the current block is less than 16×16, the weight set C may be selected.

For example, when a current image corresponds to layer 1 in a hierarchical structure of an image, the weight set A may be selected; when a current image corresponds to layer 2, the weight set B may be selected; and when a current image corresponds to layer 3, the weight set C may be selected.

Each of the plurality of weight sets may be generated as a result of training the neural network 240. For example, the weight set A, the weight set B, and the weight set C of FIG. 16 may be obtained by training the neural network 240 according to different training purposes or goals, for example by using different types of training images to train the neural network 240, or calculating loss information in different manners.

For example, in a process of training the neural network 240 shown in FIG. 23 described below, loss information 2306 corresponding to a difference between a final prediction block for training 2305 and a current block for training 2301 may be used. Because there are many methods of calculating a difference between two blocks, the weight set A may be generated by training the neural network 240 based on loss information calculated according to a first method and the weight set B may be generated by training the neural network 240 based on loss information calculated according to a second method. Also, the weight set C may be generated by training the neural network 240 based on loss information calculated according to a third method.

In an embodiment of the disclosure, the neural network setter 230 may select a neural network to be used to obtain a final prediction block from among a plurality of neural networks, and may obtain a final prediction block of a current block by applying input data (e.g., a preliminary prediction block) to the selected neural network. The plurality of neural networks may be included in the AI-based predictive decoder 132.

The plurality of neural networks may be different from each other in at least one of a type of a layer, the number of layers, a size of a filter kernel, or a stride.

In an embodiment of the disclosure, the neural network setter 230 may select a neural network to be used to obtain a final prediction block from among the plurality of neural networks, based on at least one of a size of a current block, a prediction direction of the current block, a quantization parameter for a reference block, a layer to which a current image belongs in a hierarchical structure of an image, or information obtained from a bitstream.

In an embodiment of the disclosure, the neural network setter 230 may determine whether to apply a neural network-based prediction mode, based on at least one of information obtained from a bitstream, a prediction direction of a current block, or whether an enlarged preliminary prediction block is outside a boundary of a reference image.

For example, when information obtained from a bitstream indicates that a neural network-based prediction mode is not applied, a preliminary prediction block obtained by the prediction block obtainer 220 may be transmitted to the reconstruction unit 134.

Also, for example, when an enlarged preliminary prediction block is outside a boundary of a reference image, the neural network setter 230 may determine that a neural network-based prediction mode is not applied to a current block, and when an enlarged preliminary prediction block is located within a reference image, for example, when a boundary of a reference block does not correspond to a boundary of a reference image, the neural network setter 230 may determine that a neural network-based prediction mode is applied to a current block.

Also, for example, when a prediction direction of a current block is bi-directional, for example when a motion vector for list 0 and a motion vector for list 1 are obtained for a current block, the neural network setter 230 may determine that a neural network-based prediction mode is applied to the current block, and when a prediction direction of a current block is unidirectional, the neural network setter 230 may determine that a neural network-based prediction mode is not applied to the current block.

Figure 17:
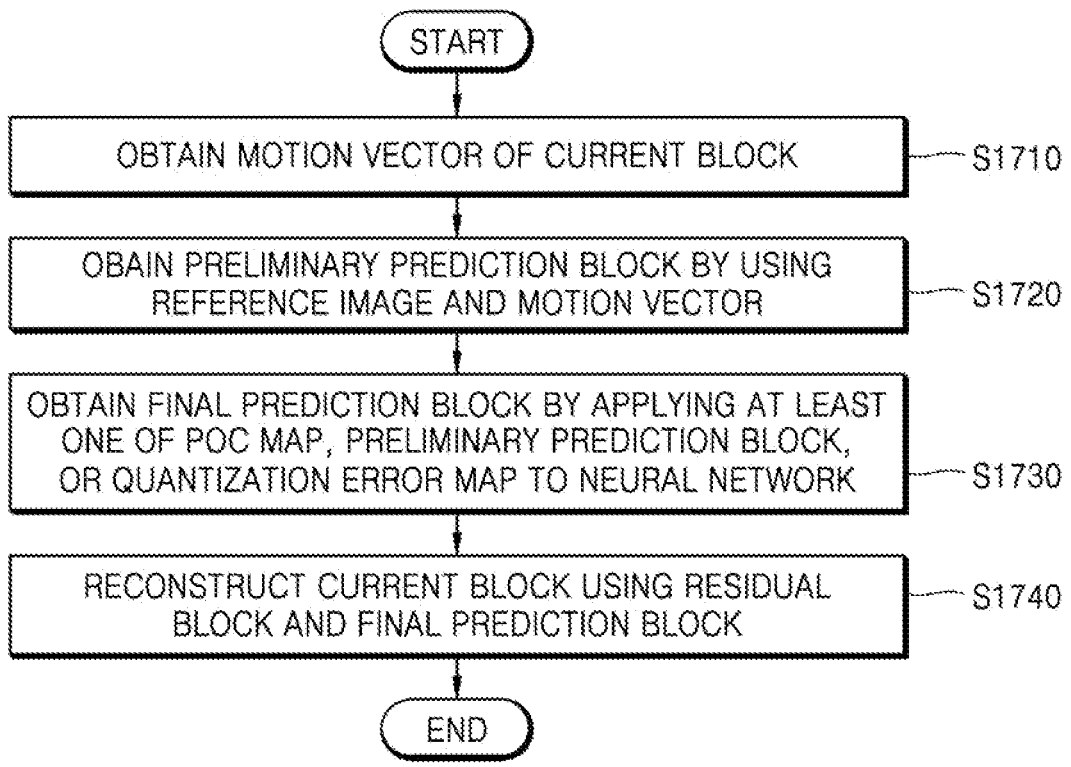
FIG. 17 is a diagram illustrating an image decoding method performed by an image decoding apparatus, according to an embodiment of the disclosure.

FIG. 17 is a diagram illustrating an image decoding method performed by the image decoding apparatus 100, according to an embodiment of the disclosure.

In operation S1710, the image decoding apparatus 100 may obtain a motion vector of a current block.

In an embodiment of the disclosure, the image decoding apparatus 100 may obtain the motion vector of the current block according to a rule-based prediction mode. The rule-based prediction mode may include a merge mode, a skip mode, an AMVP mode, a BDOF mode, a BCW mode, or a DMVR mode. Prediction mode information included in a bitstream may be used to determine which of several rule-based prediction modes should be used to obtain the motion vector of the current block.

In an embodiment of the disclosure, the image decoding apparatus 100 may use information included in a bitstream, for example, a flag or an index, to obtain the motion vector of the current block.

In an embodiment of the disclosure, the image decoding apparatus 100 may construct a motion vector candidate list including a spatial neighboring block and/or a temporal neighboring block of the current block as a motion vector candidate, to obtain the motion vector of the current block.

In operation S1720, the image decoding apparatus 100 may obtain a preliminary prediction block using the motion vector of the current block and a reference image of the current block.

In an embodiment of the disclosure, the image decoding apparatus 100 may obtain a preliminary prediction block using a reference block indicated by the motion vector of the current block in the reference image.

In an embodiment of the disclosure, a process of obtaining a preliminary prediction block similar to a current block from a reference image using a motion vector may be referred to as a motion compensation process.

In an embodiment of the disclosure, the preliminary prediction block may correspond to a result of applying interpolation to the reference block indicated by the motion vector of the current block in the reference image. Accordingly, the preliminary prediction block may include sub-pixels obtained by applying filtering to integer pixels.

In operation S1730, the image decoding apparatus 100 may obtain a final prediction block of the current block by applying, to the neural network 240, at least one a POC map including a POC difference between a current image including the current block and the reference image, the preliminary prediction block, or a quantization error map.

In an embodiment of the disclosure, sample values of the quantization error map may be calculated based on a quantization parameter for the reference block.

In an embodiment of the disclosure, the image decoding apparatus 100 may pad at least one of the POC map, the preliminary prediction block, or the quantization error map, and may obtain a final prediction block of the current block by applying, to the neural network 240, at least one of an enlarged POC map, an enlarged preliminary prediction block, or an enlarged quantization error map obtained through the padding. In an embodiment of the disclosure, the image decoding apparatus 100 may further input an enlarged current reconstructed block to the neural network 240.

In operation S1740, the image decoding apparatus 100 may reconstruct the current block using a residual block obtained from a bitstream and the final prediction block.

In an embodiment of the disclosure, the image decoding apparatus 100 may obtain the current block by adding sample values of the final prediction block to sample values of the residual block.

In an embodiment of the disclosure, the image decoding apparatus 100 may obtain information about a quantized transform coefficient from a bitstream, and may obtain the residual block by applying inverse-quantization and inverse-transform to the quantized transform coefficient.

An image including the reconstructed current block may be used to decode a next block.

Figure 18:
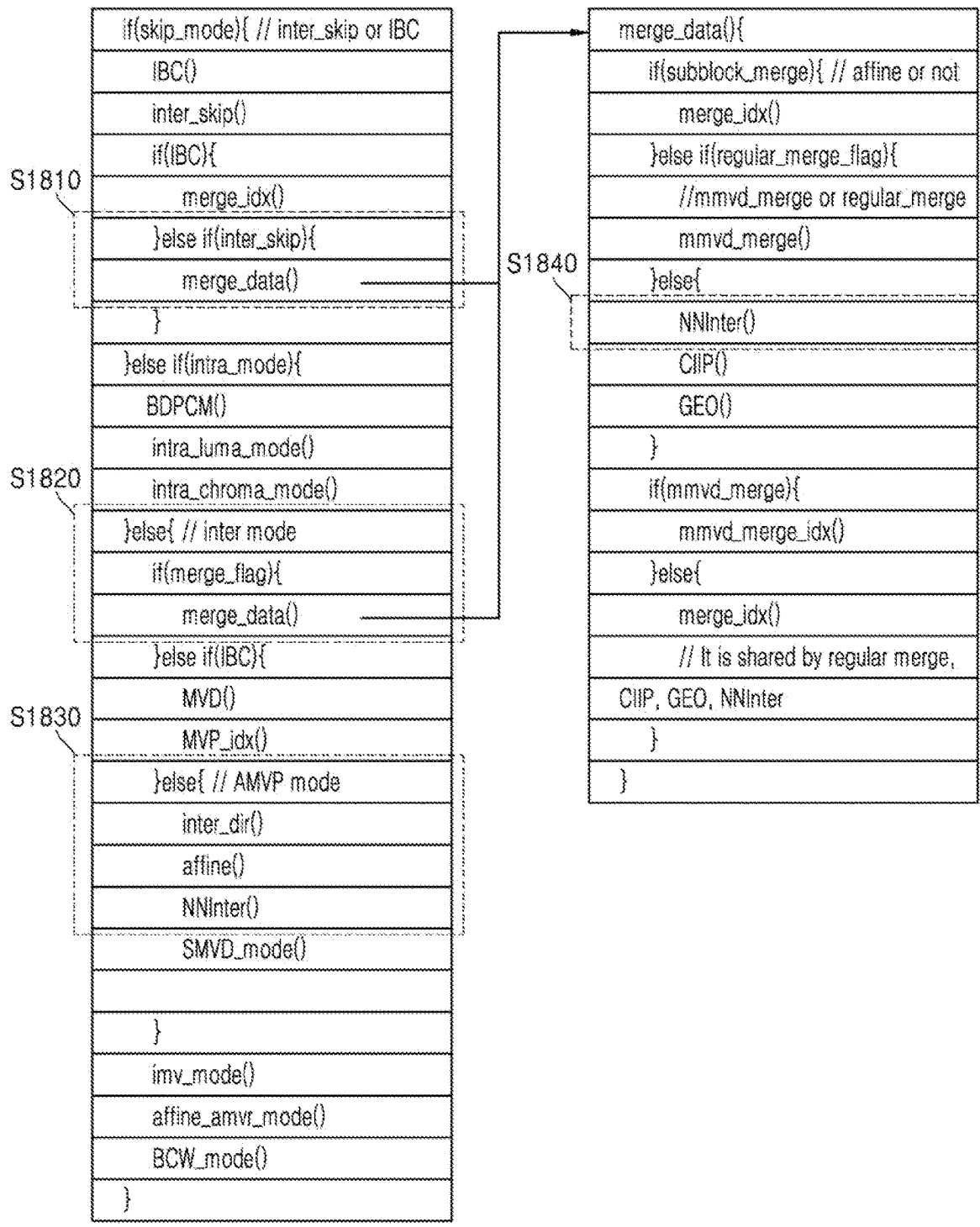
FIG. 18 is a diagram illustrating a syntax, according to an embodiment of the disclosure.

FIG. 18 is a diagram illustrating a syntax, according to an embodiment of the disclosure.

In an embodiment of the disclosure, a neural network-based prediction mode may be used together with a skip mode, a merge mode, or an AMVP mode.

Referring to FIG. 18, in S1810, when a skip mode is applied to a current block (inter_skip=1), merge_data( ) may be called, and NNinter( ) may be called in S1840 in merge_data( ), to apply a neural network-based prediction mode to the current block.

Also, in S1820, when a merge mode is applied to the current block (merge_flag=1), merge_data( ) may be called, and NNinter( ) may be called in S1840 in merge_data( ), to apply a neural network-based prediction mode to the current block.

Also, in S1830, when an AMVP mode is applied to the current block, NNinter( ) may be called to apply a neural network-based prediction mode to the current block.

According to an embodiment of the disclosure, because a motion vector of the current block obtained according to an existing skip mode, a merge mode, or an AMVP mode is adjusted based on the neural network 240 for each sample, a final prediction block more similar to the current block may be obtained.

Figure 19:
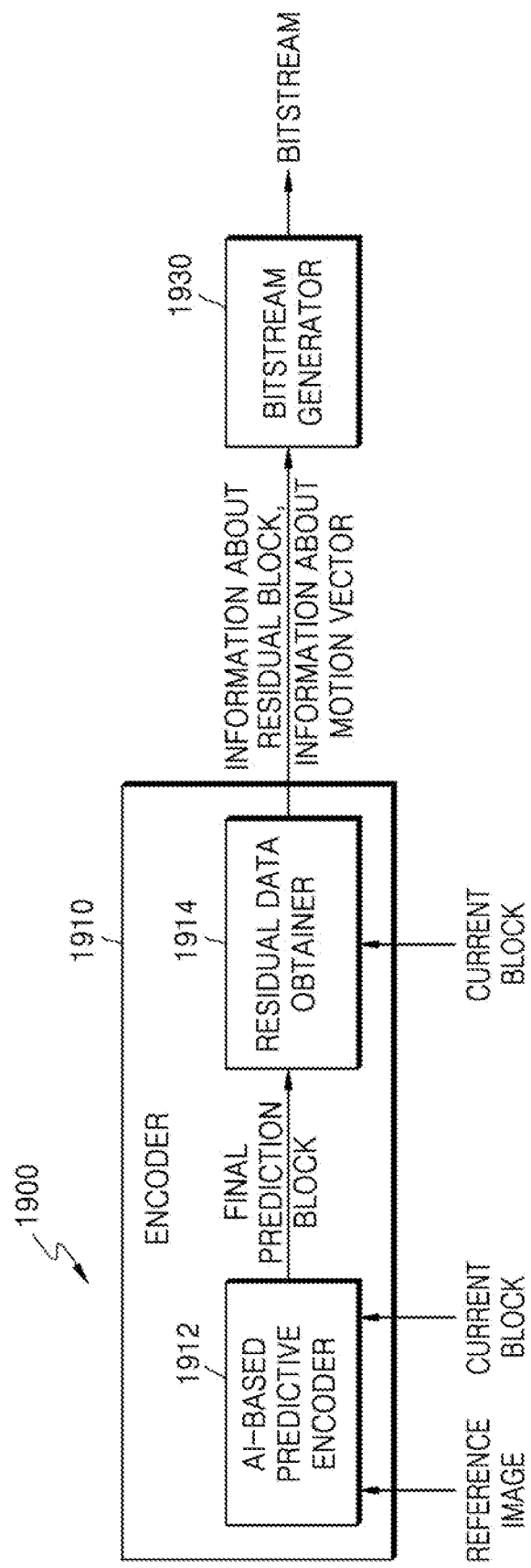
FIG. 19 is a diagram illustrating a configuration of an image encoding apparatus, according to an embodiment of the disclosure.

FIG. 19 is a diagram illustrating a configuration of the image encoding apparatus 1900, according to an embodiment of the disclosure.

Referring to FIG. 19, the image encoding apparatus 1900 may include an encoder 1910 and a bitstream generator 1930. The encoder 1910 may include an AI-based predictive encoder 1912 and a residual data obtainer 1914.

In an embodiment of the disclosure, the encoder 1910 may correspond to the predictive encoder 2415, the transform and quantization unit 2420, the inverse-quantization and inverse-transform unit 2430, the deblocking filtering unit 2435, and the loop filtering unit 2440 of FIG. 24. In an embodiment of the disclosure, the bitstream generator 1930 may correspond to the entropy encoder 2425 of FIG. 24.

The encoder 1910 and the bitstream generator 1930 may be implemented as, by, or using at least one processor. The encoder 1910 and the bitstream generator 1930 may operate according to at least one instruction stored in at least one memory.

Although the encoder 1910 and the bitstream generator 1930 are individually illustrated in FIG. 19, embodiments are not limited thereto. For example, the encoder 1910 and the bitstream generator 1930 may be implemented through one processor. In this case, the encoder 1910 and the bitstream generator 1930 may be implemented as, by, or using a dedicated processor, or may be implemented through a combination of software and a general-purpose processor such as an AP, a CPU, or a GPU. Also, when the encoder 1910 and the bitstream generator 1930 are implemented as, by, or using a dedicated processor, the dedicated processor may include a memory for implementing an embodiment of the disclosure or a memory processor for using an external memory.

In an embodiment of the disclosure, the encoder 1910 and the bitstream generator 1930 may include a plurality of processors. In this case, the encoder 1910 and the bitstream generator 1930 may be implemented through a combination of dedicated processors, or a combination of software and a plurality of general-purpose processors such as an AP, a CPU, and a GPU.

The encoder 1910 may encode a current block using a reference image of the current block. Information about a residual block and information about a motion vector may be output as a result of encoding the current block.

In an embodiment of the disclosure, the information about the residual block may not be output by the encoder 1910 according to a rule-based coding mode (e.g., a skip mode) for the current block.

In an embodiment of the disclosure, the AI-based predictive encoder 1912 may obtain a final prediction block of the current block using the current block and the reference image. The final prediction block may be transmitted to the residual data obtainer 1914.

The residual data obtainer 1914 may obtain a residual block corresponding to a difference between the current block and the final prediction block.

In an embodiment of the disclosure, the residual data obtainer 1914 may obtain the residual block by subtracting sample values of the final prediction block from sample values of the current block.

In an embodiment of the disclosure, the residual data obtainer 1914 may obtain a quantized transform coefficient by applying transform and quantization to samples of the residual block.

The information about the residual block and the information about the motion vector obtained by the encoder 1910 may be transmitted to the bitstream generator 1930.

In an embodiment of the disclosure, the information about the residual block may include information about the quantized transform coefficient (e.g., a flag indicating whether the quantized transform coefficient is 0).

In an embodiment of the disclosure, the information about the motion vector may include information indicating one or more motion vector candidates included in a motion vector candidate list, for example, a flag or an index.

In an embodiment of the disclosure, the information about the motion vector may include a differential motion vector between a motion vector of the current block and a prediction motion vector.

The bitstream generator 1930 may generate a bitstream including a result of encoding the current block.

The bitstream may be transmitted to the image decoding apparatus 100 through a network. In an embodiment of the disclosure, the bitstream may be stored in any of data storage media including a magnetic medium such as a hard disk, a floppy disk, or a magnetic tape, an optical recording medium such as a CD-ROM or a DVD, and a magneto-optical medium such as a floptical disk.

In an embodiment of the disclosure, the bitstream generator 1930 may generate the bitstream by entropy coding syntax elements corresponding to a result of encoding an image.

Figure 20:
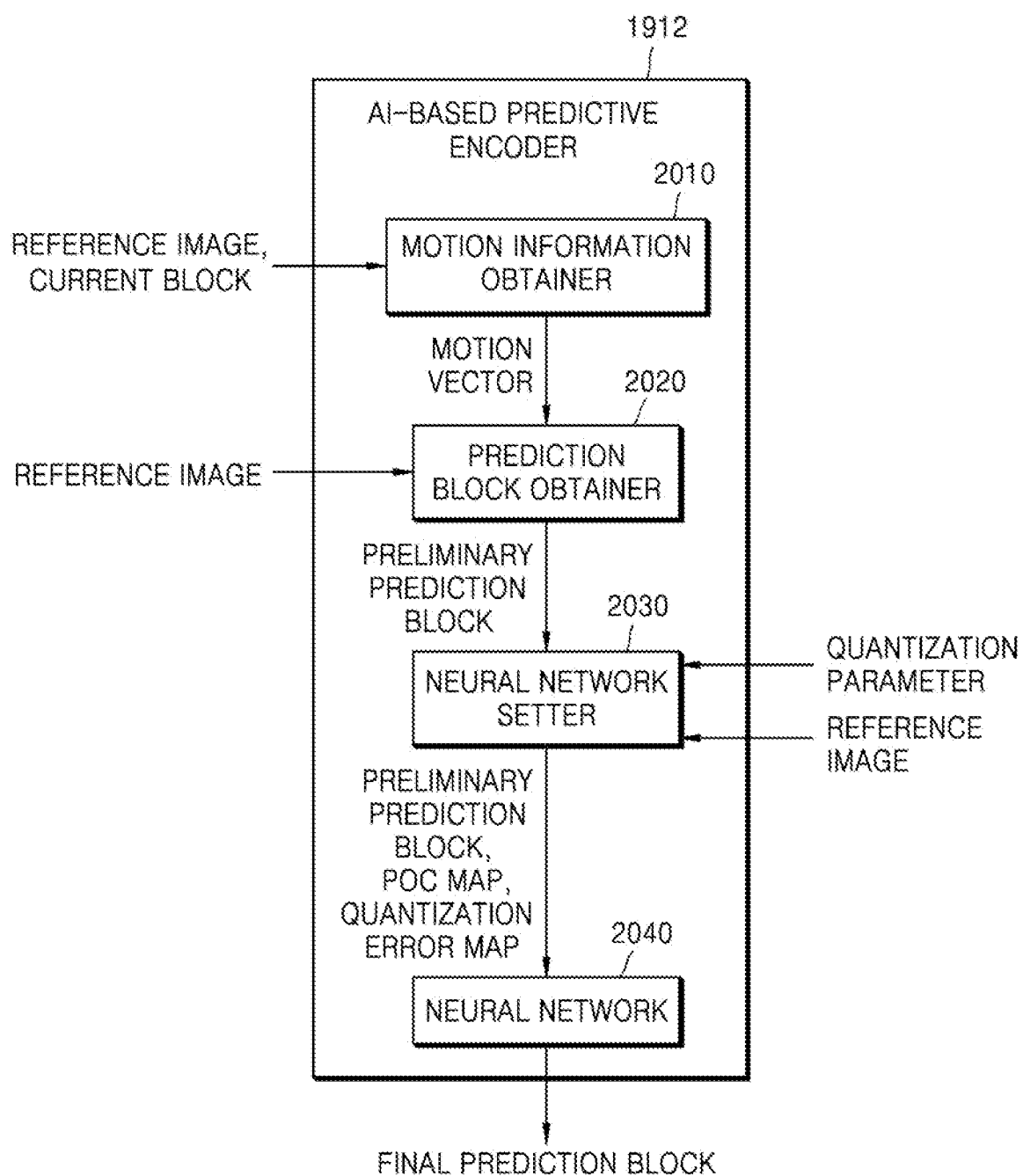
FIG. 20 is a diagram illustrating a configuration of an AI-based predictive encoder, according to an embodiment of the disclosure.

FIG. 20 is a diagram illustrating a configuration of the AI-based predictive encoder 1912, according to an embodiment of the disclosure.

Referring to FIG. 20, the AI-based predictive encoder 1912 may include the motion information obtainer 2010, a prediction block obtainer 2020, a neural network setter 2030, and a neural network 2040.

The neural network 2040 may be stored in a memory. In an embodiment of the disclosure, the neural network 2040 may be implemented as, by, or using an AI processor.

The motion information obtainer 2010 may search for a block similar to a current block in a reference image, and may obtain a motion vector indicating the searched block.

In an embodiment of the disclosure, to encode a motion vector of the current block, the motion information obtainer 2010 may construct a motion vector candidate list including a motion vector of at least one of a spatial neighboring block or a temporal neighboring block of the current block as a motion vector candidate.

In an embodiment of the disclosure, the motion vector obtained by the motion information obtainer 2010 may include a motion vector for list 0, a motion vector for list 1, or a motion vector for list 0 and a motion vector for list 1.

The motion vector for list 0 may be a motion vector for indicating a reference block in a reference image included in list 0 (or a reference image list 0), and the motion vector for list 1 may be a motion vector for indicating a reference block in a reference image included in list 1 (or reference image list 1).

The prediction block obtainer 2020 may obtain a preliminary prediction block using a reference block indicated by the motion vector in the reference image.

In an embodiment of the disclosure, the preliminary prediction block may be obtained by applying interpolation to the reference block indicated by the motion vector in the reference image. In this case, the preliminary prediction block may include sub-pixels obtained through filtering on integer pixels.

In an embodiment of the disclosure, the motion information obtainer 2010 and the prediction block obtainer 2020 may obtain the preliminary prediction block according to a rule-based prediction mode.

As described above, when the motion vector for list 0 is obtained by the motion information obtainer 2010, the prediction block obtainer 2020 may obtain the preliminary prediction block using the reference block indicated by the motion vector for list 0 in the reference image included in list 0.

In an embodiment of the disclosure, when the motion vector for list 1 is obtained by the motion information obtainer 2010, the prediction block obtainer 2020 may obtain the preliminary prediction block using the reference block indicated by the motion vector for list 1 in the reference image included in list 1.

In an embodiment of the disclosure, when the motion vector for list 0 and the motion vector for list 1 are obtained by the motion information obtainer 2010, the prediction block obtainer 2020 may obtain the preliminary prediction block for list 0 using the reference block indicated by the motion vector for list 0 in the reference image included in list 0, and may obtain the preliminary prediction block for list 1 using the reference block indicated by the motion vector for list 1 in the reference image included in list 1.

The neural network setter 2030 may obtain data to be input to the neural network 2040.

In an embodiment of the disclosure, the neural network setter 2030 may obtain the data to be input to the neural network 2040 based on the reference image, the preliminary prediction block and a quantization parameter for the reference block.

In an embodiment of the disclosure, a final prediction block of the current block may be obtained when at least one of the preliminary prediction block, a POC map, or a quantization error map is applied by the neural network setter 2030 to the neural network 2040.

The neural network setter 2030 and the neural network 2040 may be the same as, or similar to the neural network setter 230 and the neural network 240 included in the AI-based predictive decoder 132 of FIG. 2, and thus, a redundant or duplicative description thereof may be omitted.

In an embodiment of the disclosure, the neural network setter 2030 may select any one of different methods of obtaining a quantization error map (e.g., methods of obtaining a quantization error map of FIGS. 5 to 8), and may obtain a quantization error map according to the selected method.

In an embodiment of the disclosure, the neural network setter 2030 may select any one of different methods of obtaining a quantization error map (e.g., methods of obtaining a quantization error map of FIGS. 5 to 8) based on cost. During cost calculation, rate-distortion cost may be used.

In an embodiment of the disclosure, the motion information obtainer 2010 may change precision of the motion vector of the current block from fractional precision to integer precision, and the prediction block obtainer 2020 may obtain the preliminary prediction block according to the motion vector having the integer precision. In an embodiment of the disclosure, the reference block indicated in the reference image by the motion vector having the integer precision may be determined as the preliminary prediction block.

When precision of the motion vector of the current block is changed to integer precision, the number of bits for expressing the motion vector of the current block may be reduced, and thus, a bit rate of a bitstream may be reduced.

Another reason why precision of the motion vector of the current block may be changed from fractional precision to integer precision may be that when information about a motion vector with low precision is intentionally provided to the neural network 2040, the neural network 2040 may derive an accurate motion vector from the inaccurate motion vector.

Precision change of the motion vector according to an embodiment of the disclosure may be related to an AMVR mode included in the Versatile Video Coding (VVC) standard. The AMVR mode may be a mode in which resolutions of a residual motion vector and a motion vector are adaptively selected and used.

In the AMVR mode, a motion vector and a residual motion vector may be generally encoded/decoded using any one of resolutions of ¼ pel, ½ pel, 1 pel, and 4 pel.

When the current block is encoded/decoded using a motion vector of 1 pel or 4 pel in the AMVR mode, a final prediction block such as one generated based on a motion vector of a higher resolution through a neural network-based prediction mode may be expected.

Also, when the current block is encoded/decoded using a motion vector of ¼ pel or ½ pel in the AMVR mode, because ¼ pel or ½ pel is changed to 1 pel in a neural network-based prediction mode, the number of bits required to signal a motion vector may be reduced, and thus, a final prediction block having high quality may be obtained through processing of the preliminary prediction block by the neural network 2040.

An example of a method by which the motion information obtainer 2010 changes precision of the motion vector of the current block from fractional precision to integer precision is described with reference to FIG. 21.

Figure 21:
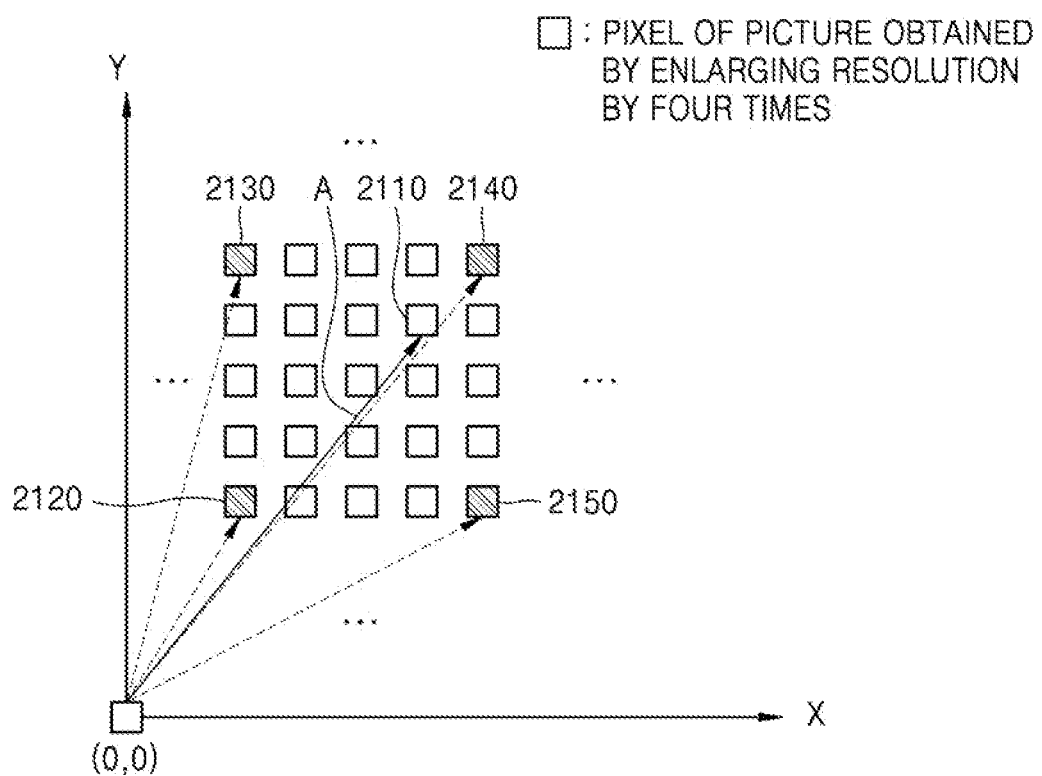
FIG. 21 is a diagram for describing a method of changing a motion vector of fractional precision to a motion vector of integer precision, according to an embodiment of the disclosure.

FIG. 21 is a diagram for describing a method of changing a motion vector of fractional precision to a motion vector of integer precision, according to an embodiment of the disclosure.

In an embodiment of the disclosure, when precision of a motion vector A of a current block is fractional precision (e.g., ½ pel, ¼ pel, or ⅛ pel), the motion information obtainer 2010 may change the motion vector A of the current block to indicate an integer pixel.

In the example illustrated in FIG. 21, the motion vector A may indicate coordinates (19/4, 27/4) 2110 based on coordinates (0,0). Because the coordinates (19/4, 27/4) 2110 are not an integer pixel, the motion information obtainer 2010 may adjust the motion vector A to indicate an integer pixel.

Coordinates of neighboring integer pixels around the coordinates (19/4, 27/4) 2110 may be (16/4, 28/4) 2130, (16/4, 24/4) 2120, (20/4, 28/4) 2140, and (20/4, 24/4) 2150. In this case, the motion information obtainer 2010 may change the motion vector A to indicate coordinates (20/4, 28/4) 2140 located at an upper right end, instead of the coordinates (19/4, 27/4) 2110.

In an embodiment of the disclosure, the motion information obtainer 2010 may change the motion vector A to indicate the coordinates 2120 located at a lower left end, the coordinates 2130 located at an upper left end, or the coordinates 2150 located at a lower right end.

A method of changing fractional precision of the motion vector A to integer precision may be referred to as motion vector rounding.

Figure 22:
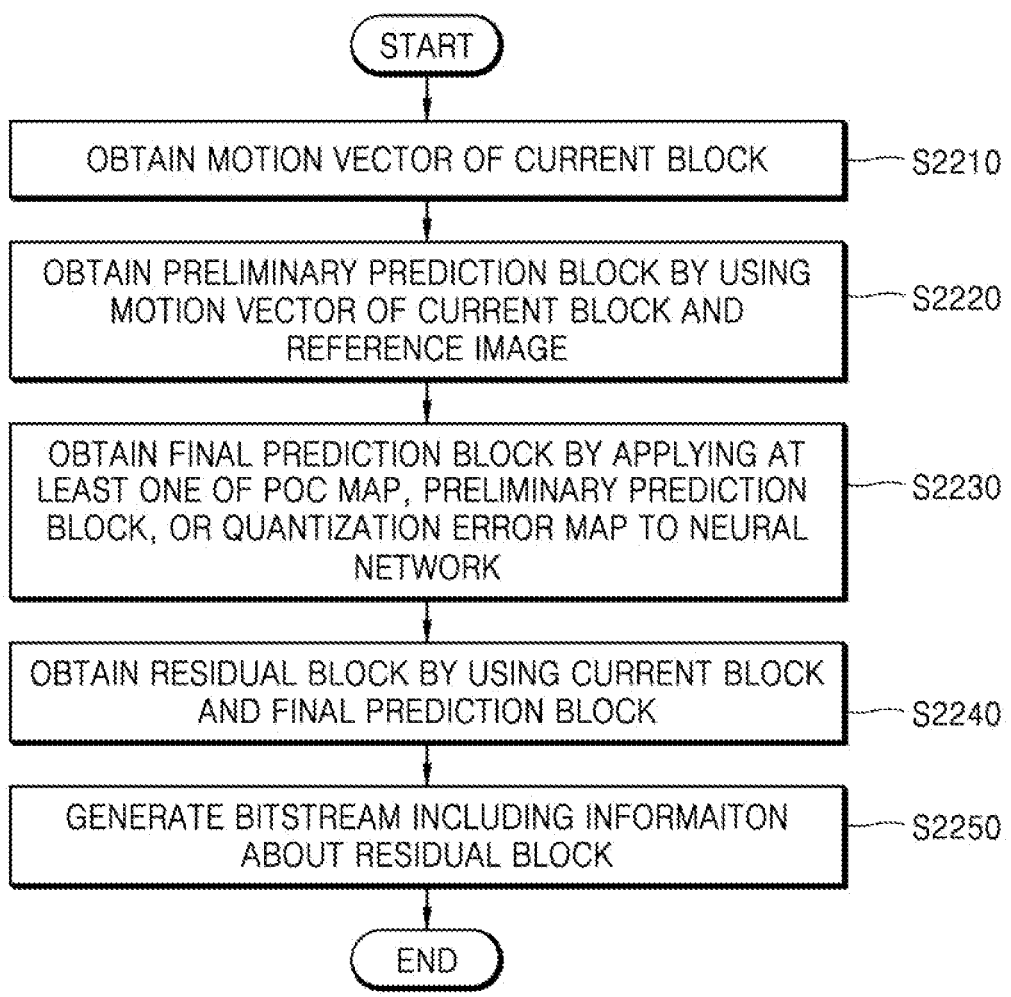
FIG. 22 is a diagram illustrating an image encoding method performed by an image encoding apparatus, according to an embodiment of the disclosure.

FIG. 22 is a diagram illustrating an image encoding method performed by the image encoding apparatus 1900, according to an embodiment of the disclosure.

In operation S2210, the image encoding apparatus 1900 may obtain a motion vector of a current block using a reference image.

In an embodiment of the disclosure, the image encoding apparatus 1900 may obtain a motion vector indicating a block similar to the current block in the reference image.

In an embodiment of the disclosure, a process of obtaining the motion vector of the current block using the reference image may be referred to as a motion prediction process.

In operation S2220, the image encoding apparatus 1900 may obtain a preliminary prediction block using the motion vector of the current block and the reference image of the current block.

In an embodiment of the disclosure, the image encoding apparatus 1900 may obtain the preliminary prediction block using a reference block indicated in the reference image by the motion vector of the current block.

In an embodiment of the disclosure, a process of obtaining the preliminary prediction block similar to the current block from the reference image may be referred to as a motion compensation process.

In an embodiment of the disclosure, the preliminary prediction block may correspond to a result of applying interpolation to the reference block indicated by the motion vector of the current block in the reference image.

In operation S2230, the image encoding apparatus 1900 may obtain a final prediction block of the current block by applying, to the neural network 2040, at least one of a POC map including a POC difference between a current image including the current block and the reference image as sample values, the preliminary prediction block, or a quantization error map.

In an embodiment of the disclosure, sample values of the quantization error map may be calculated based on a quantization parameter for a reference block.

In an embodiment of the disclosure, the image encoding apparatus 1900 may pad at least one of the POC map, the preliminary prediction block, or the quantization error map, and may obtain the final prediction block of the current block by applying, to the neural network 2040, at least one of an enlarged POC map, an enlarged preliminary prediction block, or an enlarged quantization error map obtained through the padding. In this case, in an embodiment of the disclosure, the image encoding apparatus 1900 may further input an enlarged current reconstructed block to the neural network 2040.

In operation S2240, the image encoding apparatus 1900 may obtain a residual block using the current block and the final prediction block.

In an embodiment of the disclosure, the image encoding apparatus 1900 may obtain the residual block by subtracting sample values of the final prediction block from sample values of the current block.

In an embodiment of the disclosure, the image encoding apparatus 1900 may obtain quantized transform coefficients by applying transform and quantization to samples of the residual block.

In operation S2250, the image encoding apparatus 1900 may generate a bitstream including information about the residual block.

In an embodiment of the disclosure, the information about the residual block may include information about the quantized transform coefficient (e.g., a flag indicating whether the quantized transform coefficient is 0).

In an embodiment of the disclosure, the bitstream may further include information about the motion vector of the current block. The information about the motion vector of the current block may include information indicating one or more motion vector candidates from among motion vector candidates included in a motion vector candidate list, for example, a flag or an index.

In an embodiment of the disclosure, the information about the motion vector may include a differential motion vector between the motion vector of the current block and a prediction motion vector.

In an embodiment of the disclosure, the bitstream may not include the information about the residual block. For example, when a rule-based prediction mode applied to the current block is a skip mode, the bitstream may not include the information about the residual block for the current block.

An example of a method of training the neural network 240 used by at least one of the image decoding apparatus 100 or the image encoding apparatus 1900 is described with reference to FIG. 23.

Figure 23:
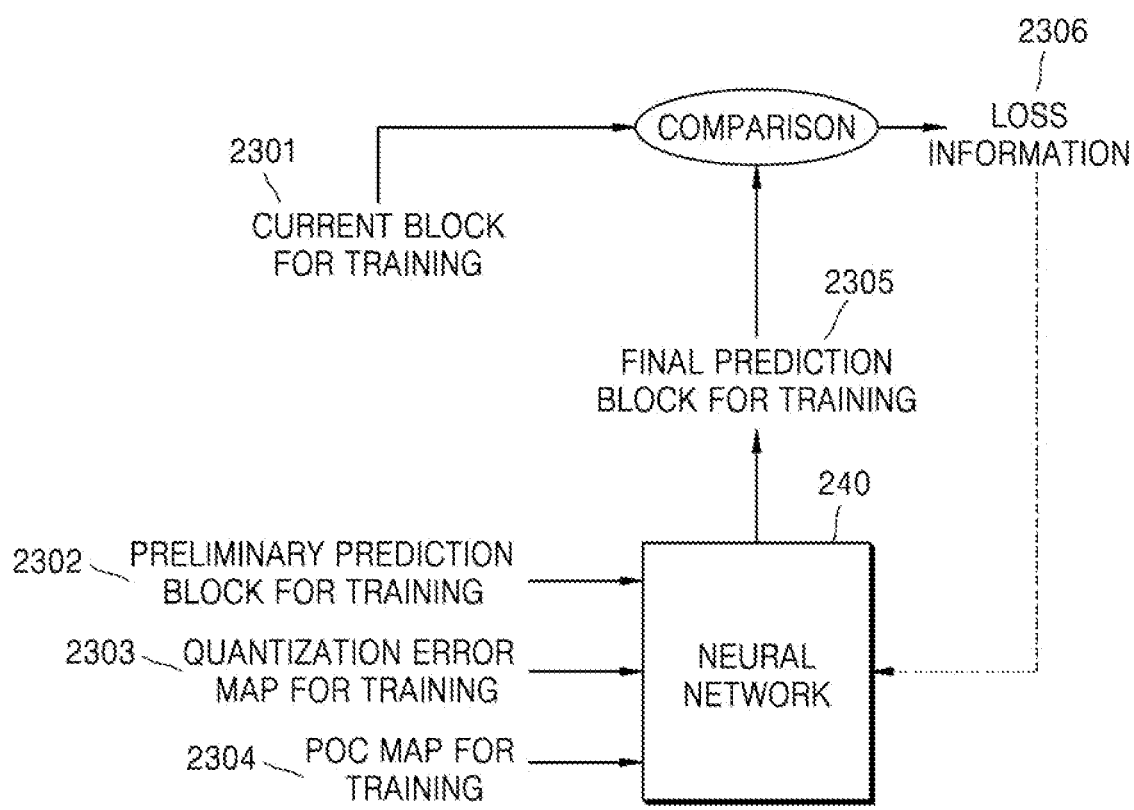
FIG. 23 is a diagram for describing a method of training a neural network, according to an embodiment of the disclosure.

FIG. 23 is a diagram for describing a method of training the neural network 240, according to an embodiment of the disclosure.

The current block for training 2301 of FIG. 23 may correspond to a current block described above. Also, a preliminary prediction block for training 2302, a quantization error map for training 2303, and a POC map for training 2304 may correspond to a preliminary prediction block, a quantization error map, and a POC map of FIGS. 2 and 20. The preliminary prediction block for training 2302 may correspond to a block identified in a reference image for training by a motion vector of the current block for training 2301.

According to a method of training the neural network 240 according to the disclosure, the neural network 240 may be trained so that the final prediction block for training 2305 output from the neural network 240 is the same as, or similar to, the current block for training 2301. To this end, the loss information 2306 corresponding to a difference between the final prediction block for training 2305 and the current block for training 2301 may be used to train the neural network 240.

An example of a process of training the neural network 240 is described in detail with reference to FIG. 23. First, the preliminary prediction block for training 2302, the quantization error map for training 2303, and the POC map for training 2304 may be input to the neural network 240, and the final prediction block for training 2305 may be output from the neural network 240. The neural network 240 may operate according to a preset weight.

The loss information 2306 corresponding to a difference between the final prediction block for training 2305 and the current block for training 2301 may be calculated, and the weight set in the neural network 240 may be updated according to the loss information 2306. The neural network 240 may update the weight to reduce or minimize the loss information 2306.

The loss information 2306 may include at least one of an L1-norm value, a L2-norm value, a structural similarity index metric (SSIM) value, a peak signal-to-noise ratio-human vision system (PSNR-HVS) value, a multiscale SSIM (MS-SSIM) value, a variance inflation factor (VIF) value, or a video multimethod assessment fusion (VMAF) value, indicating a difference between the current block for training 2301 and the final prediction block for training 2305.

The neural network 240 according to an embodiment of the disclosure may be trained by a training apparatus. The training apparatus may be the image decoding apparatus 100 or the image encoding apparatus 1900. According to an implementation, the training apparatus may be an external server. In this case, the trained neural network 240 trained by the external server and weights may be transmitted to the image decoding apparatus 100 and the image encoding apparatus 1900.

Objectives of the image decoding apparatus 100 and the image encoding apparatus 1900 using AI, and methods thereby according to an embodiment of the disclosure may be to obtain the final prediction block 955 that is more similar to the current block 300 or 1410 compared to an existing rule-based prediction mode.

Also, objectives of the image decoding apparatus 100 and the image encoding apparatus 1900 using AI, and methods thereby according to an embodiment of the disclosure may be to reduce a bit rate of a bitstream including information about a residual block.

A method of decoding an image according to an embodiment of the disclosure may include obtaining a motion vector of a current block (300;1410) (S1710).

In an embodiment of the disclosure, the method of decoding an image may include obtaining a preliminary prediction block (902) using a reference block (415;435;510;510-1;

510-2;1110) indicated by the motion vector in a reference image (410;430;1100) (S1720).

In an embodiment of the disclosure, the method of decoding an image may include obtaining a final prediction block (955) for the current block (300;1410) by applying, to a neural network (240), at least one of a picture order count (POC) map (906) including a POC difference between the reference image (410;430;1100) and a current image (400;1400) including the current block (300;1410), the preliminary prediction block (902), or a quantization error map (530;530-1;530-2;530-3;530-4;904) (S1730).

In an embodiment of the disclosure, the method of decoding an image may include reconstructing the current block (300;1410) based on the final prediction block (955) and a residual block obtained from a bitstream (S1740).

In an embodiment of the disclosure, sample values of the quantization error map (530;530-1;530-2;530-3;530-4;904) may be calculated based on a quantization parameter for the reference block (415;435;510;510-1;510-2;1110).

In an embodiment of the disclosure, the sample values of the quantization error map (530;530-1;530-2;530-3;530-4;904) may correspond to a quantization step size or a quantization error value calculated based on the quantization parameter.

In an embodiment of the disclosure, the quantization error map (530;530-1;530-2;530-3;530-4;904) may be divided into sub-areas corresponding to lower blocks of the reference block (415;435;510;510-1;510-2;1110), and sample values respectively included in the sub-areas of the quantization error map (530;530-1;530-2;530-3;530-4;904) are calculated based on a quantization parameter for a sample at a position in the lower blocks of the reference block (415;435;510;510-1;510-2;1110).

In an embodiment of the disclosure, the obtaining of the final prediction block (955) of the current block (300;1410) may include obtaining the final prediction block (955) of the current block (300;1410) by applying, to the neural network (240), at least one of an enlarged POC map, an enlarged preliminary prediction block (1150), or an enlarged quantization error map (1300).

In an embodiment of the disclosure, at least one of the enlarged POC map, the enlarged preliminary prediction block (1150), or the enlarged quantization error map (1300) may be obtained by padding the at least one of the POC map (906), the preliminary prediction block (902), or the quantization error map (530;530-1;530-2;530-3;530-4;904) according to an enlarged distance.

In an embodiment of the disclosure, the neural network

In an embodiment of the disclosure, the method of decoding an image may include one or more convolution layers, and the method may further include determining the enlarged distance based on a number of the one or more convolution layers included in the neural network (240), a size of a filter kernel used in each convolution layer, and a stride, and obtaining the enlarged preliminary prediction block (1150) including neighboring samples corresponding to the enlarged distance from among neighboring samples outside a boundary of the reference block (415;435;510;510-1;510-2;1110) in the reference image (410;430;1100) and samples of the preliminary prediction block (902).

In an embodiment of the disclosure, the method of decoding an image may further include obtaining the enlarged quantization error map (1300) including sample values calculated based on a quantization parameter for neighboring samples corresponding to the enlarged distance in the reference image (410;430;1100) and the quantization parameter for the reference block (415;435;510;510-1;510-2;1110).

In an embodiment of the disclosure, based on a boundary of the reference block (415;435;510;510-1;510-2;1110) corresponding to a boundary of the reference image (410;430;1100), neighboring samples corresponding to the enlarged distance may be determined from a closest sample available in the reference image (410;430;1100).

In an embodiment of the disclosure, the obtaining of the final prediction block (955) for the current block (300;1410) may include applying, to the neural network (240), an enlarged current reconstructed block (1500) together with at least one of the enlarged POC map, the enlarged preliminary prediction block (1150), or the enlarged quantization error map (1300).

In an embodiment of the disclosure, the enlarged current reconstructed block (1500) may include neighboring samples (1420) which were reconstructed before the current block (300;1410) in the current image (400;1400) and samples (1125) other than samples corresponding to the neighboring samples (1420) which were been reconstructed before the current block (300;1410) from among samples of the enlarged preliminary prediction block (1150).

In an embodiment of the disclosure, the method of decoding an image may further include selecting a weight set to be used to obtain the final prediction block (955) from among a plurality of weight sets, based on at least one of a size of the current block (300;1410), a prediction direction of the current block (300;1410), the quantization parameter for the reference block (415;435;510;510-1;510-2;1110), a layer to which the current image (400;1400) belongs in a hierarchical structure of an image, or information obtained from the bitstream.

In an embodiment of the disclosure, the final prediction block (955) may be obtained based on the neural network (240) operating according to the selected weight set.

In an embodiment of the disclosure, a method of encoding an image according to an embodiment of the disclosure may include obtaining a motion vector indicating a reference block (415;435;510;510-1;510-2;1110) in a reference image (410;430;1100) corresponding to a current block (300;1410) (S2210).

In an embodiment of the disclosure, the method of encoding an image may include obtaining a final prediction block (955) for the current block (300;1410) by applying, to a neural network (2040), at least one of a picture order count (POC) map (906) including a POC difference between the reference image (410;430;1100) and a current image (400;1400) including the current block (300;1410), a preliminary prediction block (902) obtained based on the reference block (415;435;510;510-1;510-2;1110), or a quantization error map (530;530-1;530-2;530-3;530-4;904) (S2230).

In an embodiment of the disclosure, the method of encoding an image may include obtaining a residual block based on the current block (300;1410) and the final prediction block (955) (S2240).

In an embodiment of the disclosure, the method of encoding an image may include generating a bitstream including information about the residual block (S2250).

In an embodiment of the disclosure, sample values of the quantization error map (530;530-1;530-2;530-3;530-4;904) may be calculated based on a quantization parameter for the reference block (415;435;510;510-1;510-2;1110).

In an embodiment of the disclosure, the method of encoding an image may further include changing precision of the obtained motion vector from fractional precision to integer precision.

In an embodiment of the disclosure, the reference block (415;435;510;510-1;510-2;1110) indicated by the motion vector having the integer precision may be determined as the preliminary prediction block (902).

In an embodiment of the disclosure, the obtaining of the final prediction block (955) of the current block (300;1410) includes may include obtaining the final prediction block (955) of the current block (300;1410) by applying, to the neural network (2040), at least one of an enlarged POC map, an enlarged preliminary prediction block (1150), or an enlarged quantization error map (1300).

In an embodiment of the disclosure, at least one of the enlarged POC map, the enlarged preliminary prediction block (1150), or the enlarged quantization error map (1300) may be obtained by padding at least one of the POC map (906), the preliminary prediction block (902), or the quantization error map (530;530-1;530-2;530-3;530-4;904) according to an enlarged distance.

An image decoding apparatus according to an embodiment of the disclosure may include at least one memory configured to store at least one instruction, and at least one processor configured to execute the at least one instruction.

In an embodiment of the disclosure, the at least one processor of the image decoding apparatus may be configured to obtain a motion vector of a current block (300;1410).

In an embodiment of the disclosure, the at least one processor of the image decoding apparatus may be configured to obtain a preliminary prediction block (902) based on a reference block (415;435;510;510-1;510-2;1110) indicated by the motion vector in a reference image (410;430;1100).

In an embodiment of the disclosure, the at least one processor of the image decoding apparatus may be configured to obtain a final prediction block (955) for the current block (300;1410) by applying, to a neural network (240), at least one of a picture order count (POC) map (906) including a POC difference between the reference image (410;430; 1100) and a current image (400;1400) including the current block (300;1410), the preliminary prediction block (902), or a quantization error map (530;530-1;530-2;530-3;530-4; 904).

In an embodiment of the disclosure, the at least one processor of the image decoding apparatus may be configured to reconstruct the current block (300;1410) based on the final prediction block (955) and a residual block obtained from a bitstream.

In an embodiment of the disclosure, sample values of the quantization error map (530;530-1;530-2;530-3;530-4;904) may be calculated based on a quantization parameter for the reference block (415;435;510;510-1;510-2;1110).

An image encoding apparatus according to an embodiment of the disclosure may include at least one memory configured to store at least one instruction, and at least one processor configured to execute the at least one instruction.

In an embodiment of the disclosure, the at least one processor of the image encoding apparatus may be configured to obtain a motion vector indicating a reference block (415;435;510;510-1;510-2;11110) in a reference image (410;430;1100) corresponding to a current block (300; 1410).

In an embodiment of the disclosure, the at least one processor of the image encoding apparatus may be configured to obtain a final prediction block (955) for the current block (300;1410) by applying, to a neural network (2040), at least one of a picture order count (POC) map (906) including a POC difference between the reference image (410;430; 1100) and a current image (400;1400) including the current block (300;1410), a preliminary prediction block (902) obtained based on the reference block (415;435;510;510-1; 510-2;1110), or a quantization error map (530;530-1;530-2; 530-3;530-4;904).

In an embodiment of the disclosure, the at least one processor of the image encoding apparatus may be configured to obtain a residual block based on the current block (300;1410) and the final prediction block (955).

In an embodiment of the disclosure, the at least one processor of the image encoding apparatus may be configured to generate a bitstream including information about the residual block.

In an embodiment of the disclosure, sample values of the quantization error map (530;530-1;530-2;530-3;530-4;904) may be calculated based on a quantization parameter for the reference block (415;435;510;510-1;510-2;1110).

In an embodiment of the disclosure, the image decoding apparatus 100 and the image encoding apparatus 1900 using AI and methods thereby according to an embodiment of the disclosure may obtain the final prediction block 955 that is more similar to the current block 300 or 1410 compared to an existing rule-based prediction mode.

Also, the image decoding apparatus 100 and the image encoding apparatus 1900 using AI, and methods thereby according to an embodiment of the disclosure may reduce a bit rate of a bitstream including information about a residual block.

Embodiments of the disclosure may be provided as a computer-executable program, and the program may be stored in a machine-readable storage medium.

The machine-readable storage medium may be provided as a non-transitory storage medium. Here, 'non-transitory' means that the storage medium does not include a signal (e.g., an electromagnetic wave) and is tangible, but does not distinguish whether data is stored semi-permanently or temporarily in the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be distributed in a form of machine-readable storage medium (e.g., a CD-ROM), or distributed (e.g., downloaded or uploaded) through an application store or directly or online between two user devices (e.g., smart phones). When distributed online, at least part of the computer program product (e.g., a downloadable application) may be temporarily generated or at least temporarily stored in a machine-readable storage medium, such as a memory of a server of a manufacturer, a server of an application store, or a relay server.

Although the scope of the disclosure has been described with reference to embodiments, the scope of the disclosure is not limited thereto, and various modifications and changes may be made by one of ordinary skill in the art without departing from the scope of the disclosure.

The invention claimed is:
1. A method of decoding an image, the method comprising:
obtaining a motion vector of a current block;

obtaining a first prediction block based on a reference block in a reference image indicated by the motion vector;

obtaining a second prediction block for the current block by applying, to a neural network, at least one of an enlarged picture order count (POC) map comprising a POC difference between the reference image and a current image comprising the current block, an enlarged first prediction block, or an enlarged quantization error map; and reconstructing the current block based on the second prediction block, wherein sample values of a quantization error map are calculated based on a quantization parameter for the reference block, wherein the at least one of the enlarged POC map, the enlarged first prediction block, or the enlarged quantization error map is obtained by padding at least one of a POC map, the first prediction block, or the quantization error map according to an enlarged distance.

2. The method of claim 1, wherein the sample values of the quantization error map correspond to a quantization step size or a quantization error value calculated based on the quantization parameter for the reference block.

3. The method of claim 1, wherein the quantization error map is divided into sub-areas corresponding to lower blocks of the reference block, and wherein sample values respectively included in the sub-areas of the quantization error map are calculated based on a quantization parameter for a sample at a position in the lower blocks of the reference block.

4. The method of decoding an image of claim 1, wherein the neural network comprises one or more convolution layers, and wherein the method further comprises:
determining the enlarged distance based on a number of the one or more convolution layers included in the neural network, a size of a filter kernel used in the one or more convolution layers, and a stride; and obtaining the enlarged first prediction block comprising neighboring samples corresponding to the enlarged distance from among neighboring samples outside a boundary of the reference block in the reference image and samples of the first prediction block.

5. The method of claim 4, further comprising obtaining the enlarged quantization error map comprising sample values calculated from a quantization parameter for neighboring samples corresponding to the enlarged distance in the reference image and the quantization parameter for the reference block.

6. The method of claim 4, wherein, based on a boundary of the reference block corresponding to a boundary of the reference image, neighboring samples corresponding to the enlarged distance are determined from a closest sample available in the reference image.

7. The method of claim 1, wherein the obtaining of the second prediction block for the current block comprises applying, to the neural network, an enlarged current reconstructed block together with the at least one of the enlarged POC map, the enlarged first prediction block, or the enlarged quantization error map, and wherein the enlarged current reconstructed block comprises neighboring samples which were reconstructed before the current block in the current image and samples other than samples corresponding to the neighboring samples from among samples of the enlarged first prediction block.

8. The method of claim 1, further comprising selecting a weight set used to obtain the second prediction block from among a plurality of weight sets, based on at least one of a size of the current block, a prediction direction of the current block, the quantization parameter for the reference block, a layer to which the current image belongs in a hierarchical structure of an image, or information obtained from a bitstream, and wherein the second prediction block is obtained based on the neural network operating according to the selected weight set.

9. A non-transitory computer-readable recording medium having recorded thereon a program for performing the method of claim 1, on a computer.

10. A method of encoding an image, the method comprising:
obtaining a motion vector indicating a reference block in a reference image corresponding to a current block;

applying, to a neural network, at least one of an enlarged picture order count (POC) map comprising a POC difference between the reference image and a current image comprising the current block, an enlarged first prediction block obtained based on the reference block, or an enlarged quantization error map to obtain a second prediction block for the current block; and generating a bitstream by using the second prediction block, wherein sample values of a quantization error map are calculated based on a quantization parameter for the reference block, wherein the at least one of the enlarged POC map, the enlarged first prediction block, or the enlarged quantization error map is obtained by padding at least one of a POC map, a first prediction block, or the quantization error map according to an enlarged distance.

11. The method of claim 10, further comprising changing precision of the obtained motion vector from fractional precision to integer precision, wherein the reference block indicated by the motion vector having the integer precision is determined as the first prediction block.

12. An image decoding apparatus comprising:
at least one memory configured to store at least one instruction; and at least one processor configured to execute the at least one instruction to:
obtain a motion vector of a current block, obtain a first prediction block based on a reference block in a reference image indicated by the motion vector, obtain a second prediction block for the current block by applying, to a neural network, at least one of an enlarged picture order count (POC) map comprising a POC difference between the reference image and a current image comprising the current block, an enlarged first prediction block, or an enlarged quantization error map, and reconstruct the current block based on the second prediction block, wherein sample values of a quantization error map are calculated based on a quantization parameter for the reference block, wherein the at least one of the enlarged POC map, the enlarged first prediction block, or the enlarged quantization error map is obtained by padding at least one of a POC map, the first prediction block, or the quantization error map according to an enlarged distance.

13. A method of transmitting the bitstream generated by the method of claim 10.

\* \* \* \* \*